(12) United States Patent
Miyoshi

(10) Patent No.: US 7,797,324 B2
(45) Date of Patent: Sep. 14, 2010

(54) DOCUMENT RETRIEVAL SYSTEM, DOCUMENT NUMBER SUBSEQUENCE ACQUISITION APPARATUS, AND DOCUMENT RETRIEVAL METHOD

(75) Inventor: Ikuo Miyoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 393 days.

(21) Appl. No.: 12/054,198

(22) Filed: Mar. 24, 2008

(65) Prior Publication Data

US 2008/0243836 A1    Oct. 2, 2008

(30) Foreign Application Priority Data

Mar. 30, 2007  (JP)  ............... 2007-091664

(51) Int. Cl.
*G06F 17/30* (2006.01)
*G06F 7/00* (2006.01)

(52) U.S. Cl. .............. 707/741; 707/753; 707/764; 707/767

(58) Field of Classification Search ............ 707/741
See application file for complete search history.

(56) References Cited

U.S. PATENT DOCUMENTS

| 6,003,043 | A  | * | 12/1999 | Hatakeyama et al. | ............. | 1/1     |
| 6,602,300 | B2 | * | 8/2003  | Ushioda et al.    | ............. | 715/264 |
| 2001/0013042 | A1 | * | 8/2001 | Sekine            | ............. | 707/501.1 |
| 2005/0138028 | A1 | * | 6/2005 | Liu et al.        | ............. | 707/5   |
| 2007/0219965 | A1 | * | 9/2007 | Sato et al.       | ............. | 707/3   |
| 2008/0098024 | A1 | * | 4/2008 | Kataoka et al.    | ............. | 707/101 |
| 2008/0222095 | A1 | * | 9/2008 | Ii                | ............. | 707/3   |
| 2010/0005096 | A1 | * | 1/2010 | Minagawa et al.   | ............. | 707/6   |

OTHER PUBLICATIONS

Sato Toshikazu, et al. "Web Search Services: InfoNavigator," Fujistu, vol. 49, No. 5, pp. 353-357, Sep. 1998.

* cited by examiner

*Primary Examiner*—Kuen S Lu
*Assistant Examiner*—Binh V Ho
(74) *Attorney, Agent, or Firm*—Greer, Burns & Crain, Ltd.

(57) ABSTRACT

A document retrieval system performing retrieval of electronic documents includes, a document database storing a plurality of pieces of document data, a transposed index storage device storing a transposed index in which the document numbers of the document data containing a keyword string are registered, a document number subsequence search start address table storage device storing a document number subsequence search start address indicating a position where an assigned document group start document number is recorded, a document retrieval managing unit having document number subsequence acquisition request means for transmitting the total number of documents, and a plurality of the document number subsequence acquisition apparatuses having assigned document group determination means for determining a document group in a sequence in accordance with the preset apparatus number of a local apparatus as the assigned document group.

9 Claims, 19 Drawing Sheets

FIG. 14

DOCUMENT NUMBER SUBSEQUENCE SEARCH START ADDRESS TABLE STORAGE DEVICE — 410

417

| KEYWORD STRING | SUBSEQUENCE SEARCH START ADDRESS | | | |
|---|---|---|---|---|
| | APPARATUS NUMBER: 0 (FOR TWO-UNIT OPERATION) | — | APPARATUS NUMBER: 1 (FOR TWO-UNIT OPERATION) | — |
| | APPARATUS NUMBER: 0 (FOR FOUR-UNIT OPERATION) | APPARATUS NUMBER: 1 (FOR FOUR-UNIT OPERATION) | APPARATUS NUMBER: 2 (FOR FOUR-UNIT OPERATION) | APPARATUS NUMBER: 3 (FOR FOUR-UNIT OPERATION) |
| RESEARCH | 0 | 2 | 3 | 5 |
| RETRIEVAL | 7 | 8 | 10 | 11 |
| INFORMATION | 12 | 14 | 16 | 19 |
| PATENT | 22 | 24 | 26 | 27 |
| "F" TSU | 28 | 30 | 30 | 30 |

FOR BOTH 2/4-UNIT OPERATION

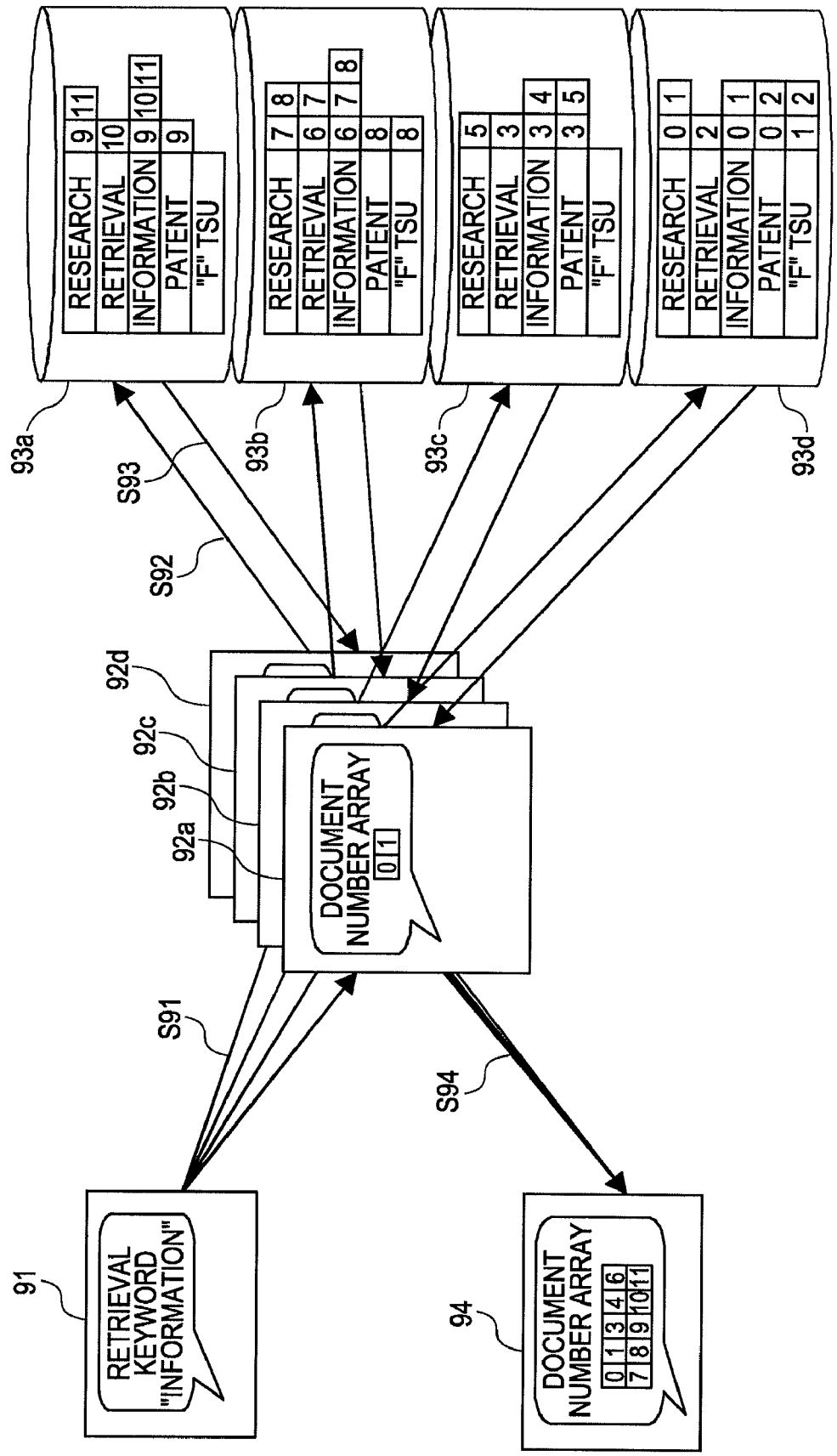

DOCUMENT RETRIEVAL SYSTEM, DOCUMENT NUMBER SUBSEQUENCE ACQUISITION APPARATUS, AND DOCUMENT RETRIEVAL METHOD

BACKGROUND

The present invention relates to a document retrieval system for retrieving documents containing keywords specified by a user, a document number subsequence acquisition apparatus, and a document retrieval method, and in particular, relates to a document retrieval system for retrieving documents at high speed by analyzing a large quantity of electronic documents and using a transposed index, a document number subsequence acquisition apparatus, and a document retrieval method.

A technique called a transposed index method is known as a document retrieval method for retrieving documents containing keyword strings (retrieval keyword) specified by the user from among a large quantity of electronic documents. In the transposed index method, a transposed index having a data structure in which keyword strings that could be specified by the user and information indicating a set of documents containing the keyword strings are paired is created in advance. The information indicating a set of documents mapped to keyword strings is associated with each document contained in the set of documents by an array of document numbers (document number array) uniquely identifying each document to be retrieved.

When, in a document retrieval apparatus using the transposed index method, documents containing a single retrieval keyword should be retrieved from a large quantity of documents, keyword strings corresponding to the retrieval keyword are retrieved from a transposed index. Next, the document retrieval apparatus retrieves a document number array corresponding to the detected keyword strings from the transposed index. Then, the document retrieval apparatus extracts information about documents indicated by each document number contained in the acquired document number array (for example, URL (Uniform Resource Locator) or titles of the documents) from a document database before the information is output as a retrieval result.

Incidentally, with an increasing capacity of storage devices in recent years, it has become possible to store a vast quantity of documents in the storage device. Moreover, with advancing information communication technology, it has also become possible to retrieve documents stored on many computers connected via a network. As a result, the quantity of documents to be retrieved in document retrieval is steadily on the increase. The increase in quantity of documents to be retrieved causes an increase in the quantity of data in a transposed index. Then, it takes a lot of time for a document retrieval apparatus to perform processing to fetch a document number array of documents containing relevant keyword strings from the transposed index.

Thus, in order to improve the speed of processing of fetching a document number array from the transposed index, parallelization of processing of fetching a document number array has been attempted.

FIG. 19 is a diagram exemplifying a conventional document retrieval system. The parallelized document retrieval system is provided with a plurality of transposed index storage devices 93a, 93b, 93c, and 93d. Transposed indexes are stored in the transposed index storage devices 93a, 93b, 93c, and 93d. Similar keyword strings are set to each transposed index and document numbers of documents containing each keyword string are registered with one of the transposed indexes. That is, document numbers corresponding to a vast quantity of documents are distributively stored in the plurality of transposed index storage devices 93a, 93b, 93c, and 93d.

A retrieval keyword ("information" in the example shown in FIG. 19) input into a retrieval keyword input apparatus 91 is delivered to each of a plurality of document number subsequence acquisition apparatuses 92a, 92b, 92c, and 92d (Step S91). The document number subsequence acquisition apparatuses 92a, 92b, 92c, and 92d retrieve keyword strings corresponding to the retrieval keyword from the mapped transposed index storage devices 93a, 93b, 93c, and 93d respectively (Step S92).

Further, the document number subsequence acquisition apparatuses 92a, 92b, 92c, and 92d acquire document number arrays mapped to the detected keyword strings from the mapped transposed index storage devices 93a, 93b, 93c, and 93d respectively (Step S93). Then, the document number subsequence acquisition apparatuses 92a, 92b, 92c, and 92d deliver the acquired document number arrays to a document number array summarization output apparatus 94 (Step S94). The document number array summarization output apparatus 94 summarizes the received document number arrays and outputs a summarization result as a retrieval result.

Thus, with document numbers being distributively stored in the plurality of transposed index storage devices 93a, 93b, 93c, and 93d, document number arrays can be fetched in parallel using the plurality of document number subsequence acquisition apparatuses 92a, 92b, 92c, and 92d.

SUMMARY

According to an aspect of an embodiment, a document retrieval system performing retrieval of electronic documents includes:

a document database storing a plurality of pieces of document data containing keyword strings, to each of which a document number is attached.

A transposed index storage device stores a transposed index in which the document numbers of the document data containing a keyword string are registered as an array in ascending order of numerical value of the document number by mapping to each of a plurality of the keyword strings.

A document number subsequence search start address table storage device stores a document number subsequence search start address table in which a value obtained by dividing a total number of documents, which is a number of pieces of document data registered with the document database, by a number of units planned for parallel operation is set as a number of assigned documents per unit. Document groups obtained by compiling the document data in the document database into sets, each of which has as many documents as the number of assigned documents in ascending order of the document number, are sequentially defined as assigned document groups. The value of the document number corresponding to start document data in each of the defined assigned document groups is set as an assigned document group start document number, and a subsequence search start address indicating a position where the assigned document group start document number is recorded in an array of the document numbers mapped to each of the keyword strings in the transposed index is registered by mapping to the keyword string in ascending order of value of the corresponding assigned document group start document number.

A document retrieval managing unit having document number subsequence acquisition request means transmits the total number of documents, a number of units in parallel processing indicating a number of document number subsequence acquisition apparatuses in operation, and a document number subsequence acquisition request containing a retrieval keyword to each of a plurality of the document number subsequence acquisition apparatuses in response to a document retrieval request. The request contains the retrieval keyword from a retrieval request apparatus, and document number array summarization means for generating a document number array by acquiring document number subsequences returned from a plurality of the document number subsequence acquisition apparatuses in accordance with the document number subsequence acquisition request, and summarizes the document numbers contained in the document number subsequence. Document list creation means creates a document list for the extracted document data after extracting the document data corresponding to each of the document numbers contained in the document number array generated by the document number array summarization means from the document database, and retrieval result notification means transmits the document list created by the document list creation means to the retrieval request apparatus.

A plurality of the document number subsequence acquisition apparatuses having assigned document group determination means for determining a document group in a sequence in accordance with the preset apparatus number of a local apparatus as the assigned document group when, upon receipt of the document number subsequence acquisition request from the document retrieval managing unit. The number of assigned documents per unit is calculated by dividing the total number of documents by the number of units in parallel processing. Document groups obtained by compiling the document data in the document database into sets, each having as many documents as the number of assigned documents in ascending order of document number, are sequentially defined. Subsequence search start position determination means extracts the subsequence search start address corresponding to the assigned document group start document number registered in the sequence in accordance with the apparatus number of the local apparatus from a plurality of the subsequence search start addresses associated with the keyword string corresponding to the retrieval keyword by referencing the document number subsequence search start address table in the document number subsequence search start address table storage device. Subsequence acquisition means references the transposed index in the transposed index storage device, searches the array of the document numbers from the position indicated by the subsequence search start address extracted by the subsequence search start position determination means in ascending order, acquires the document numbers contained in the assigned document group in the document number array associated with the keyword string corresponding to the retrieval keyword, and transmits a set of the acquired document numbers to the document retrieval managing unit as the document number subsequence.

BRIEF DESCRIPTION OF THE DRAWINGS

FIG. 14 is a diagram exemplifying the document number subsequence search start address table that can be used when the numbers of units for parallel operation are 2 and 4;

FIG. 19 is a diagram exemplifying a conventional document retrieval system.

EMBODIMENT

Figure 1:
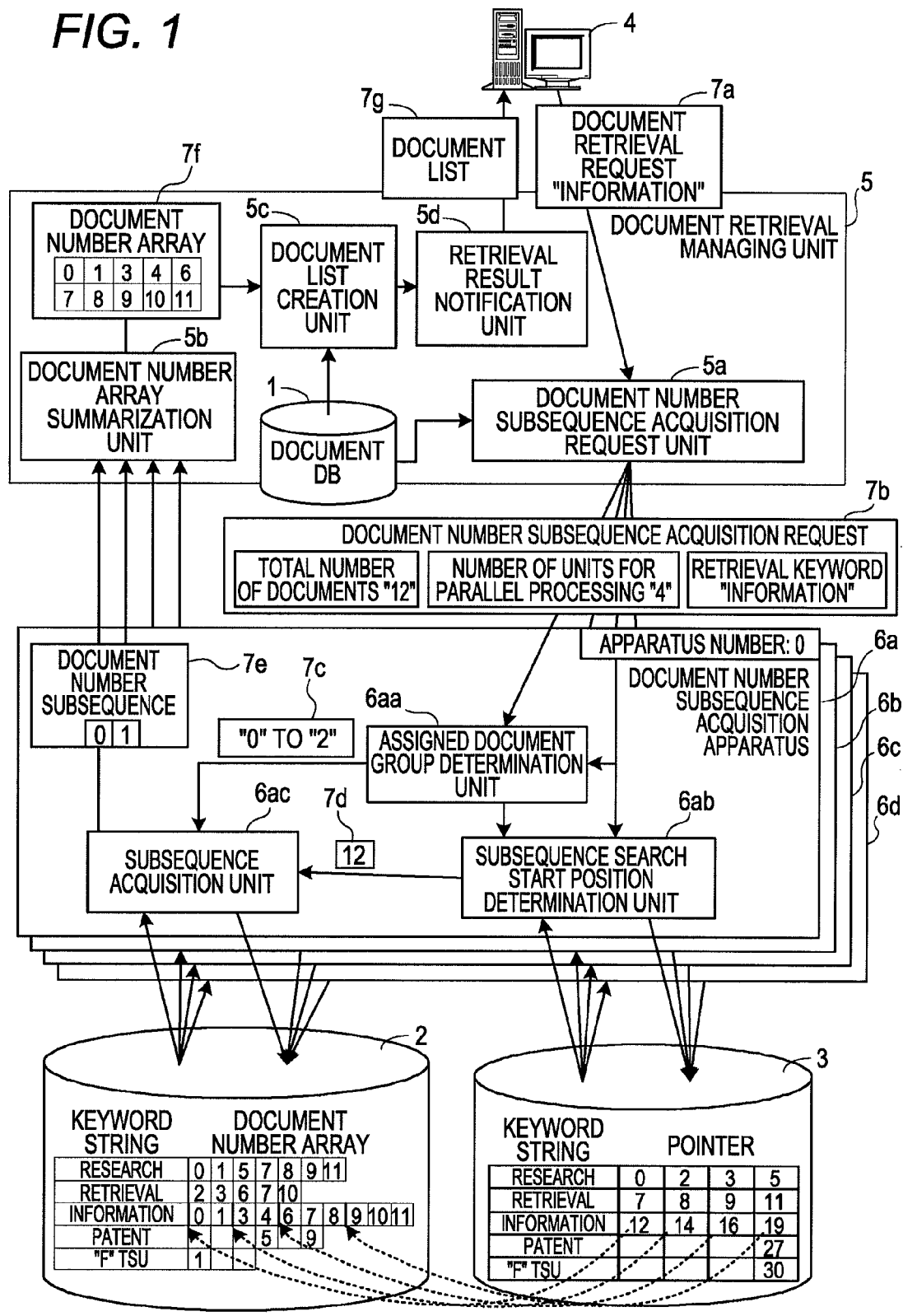
FIG. 1 is a diagram showing an outline of a document retrieval system.

In a method by which index data is divided into a plurality of pieces of data for creating a transposed index, problems shown below can be supposed.

First, there is a problem that the number of processing units used for retrieval is fixed by the number of divisions of index data for creating a transposed index. Document retrieval on the Internet is taken as an example. Documents to be retrieved on the Internet change from day to day. Thus, when a certain period passes after a document retrieval system starts its operation, the number of document number subsequence acquisition apparatuses in operation may be too many or too few compared with the number of apparatuses that can realize an appropriate retrieval processing time. If there are too few document number subsequence acquisition apparatuses compared with a quantity of documents to be retrieved, an excessive processing time (a retrieval processing time to be guaranteed being exceeded) occurs. If the document number subsequence acquisition apparatuses are parallelized with sufficient processing capacity when an operation is started, resources may be wasted, leading to lower operating efficiency of the document retrieval system.

Second, when users register document numbers of documents to be retrieved in a transposed index, document numbers should distributively be arranged so that processing loads are equalized. The procedure for equally registering document numbers is performed by operational input into each transposed index by an operations manager. As a result, too much workload is shouldered by the operations manager of document retrieval apparatuses.

Particularly when a set of documents to be retrieved is artificially collected, the set of documents is frequently classified in such a way that documents can easily be understood by people. For example, a set of documents can be classified according to the creation year based on the date when a document is created. If such a classification unit is applied to the classification of transposed index unchanged, the numbers of documents will not be equalized. Thus, operational input by an operations manager to change registration of document numbers to transposed indexes is needed so that documents are equally divided. This results in an increase in work to be done by the operations manager.

In embodiments below, by registering a subsequence search start address indicating the search start position for searching for each keyword string in a document number subsequence search start address table for each apparatus number of document number subsequence acquisition apparatuses in advance, the document number subsequence acquisition apparatus knows the search start position of a document number in a transposed index based on the document number subsequence search start address table so that a subsequence of the document number contained in an assigned document group can be extracted from the position. As a result, by preparing a plurality of document number subsequence search start address tables for different planned numbers of units of document number subsequence acquisition apparatuses to be operated in parallel, the number of document number subsequence acquisition apparatuses can swiftly be changed only by switching the document number subsequence search start address table to be used when the number of document number subsequence acquisition apparatuses to be operated in parallel is changed within a range of planned numbers of units.

Embodiments of the present invention will be described below with reference to drawings.

FIG. 1 is a diagram showing an outline of a document retrieval system. The document retrieval system is provided with a document DB 1, a transposed index storage device 2, a document number subsequence search start address table storage device 3, a document retrieval managing unit 5, and a plurality of document number subsequence acquisition apparatuses 6a, 6b, 6c, and 6d.

The document DB 1 stores a plurality of pieces of document data to which document numbers are attached.

The transposed index storage device 2 stores a transposed index. In the transposed index, document numbers of document data containing a keyword string are registered in ascending order of numerical value of the document number by mapping to each of a plurality of keyword strings.

The document number subsequence search start address table storage device 3 stores document number subsequence search start address tables. In a document number subsequence search start address table, a subsequence search start address indicating the position where an assigned document group start document number is recorded in an array of document numbers mapped to each of the keyword strings in the transposed index is registered by mapping to the keyword string in ascending order of value of the corresponding assigned document group start document number. Here, the assigned document group start document number is a value of the document number corresponding to start document data containing the corresponding keyword string in each document group when the document data in the document DB 1 is compiled to sequentially define sets, each set having as many documents as the number of assigned documents in ascending order of document number. The number of assigned documents per unit is a value obtained by dividing the total number of documents indicating the number of pieces of document data registered with the document DB 1 by the number of units planned for parallel operation of planned document number subsequence acquisition apparatuses.

The document retrieval managing unit 5 has document number subsequence acquisition request unit 5a, document number array summarization unit 5b, document list creation unit 5c, and retrieval result notification unit 5d.

The document number subsequence acquisition request means 5a transmits in response to a document retrieval request 7a containing a retrieval keyword from a retrieval request apparatus 4 the total number of documents indicating the number of pieces of document data registered with the document DB 1, the number of units in parallel processing indicating the number of document number subsequence acquisition apparatuses in operation, and a document number subsequence acquisition request 7b containing the retrieval keyword to each of the plurality of document number subsequence acquisition apparatuses 6a, 6b, 6c, and 6d.

The document number array summarization unit 5b acquires document number subsequences 7e returned from the plurality of document number subsequence acquisition apparatuses in accordance with the document number subsequence acquisition request 7b and generates a document number array 7f by summarizing document numbers contained in the document number subsequences 7e.

The document list creation unit 5c extracts document data corresponding to each of the document numbers contained in the document number array 7f created by the document number array summarization unit 5b from the document database and creates a document list 7g regarding the extracted document data.

The retrieval result notification means 5d transmits the document list 7g created by the document list creation unit 5c to the retrieval request apparatus.

The document number subsequence acquisition apparatus 6a has assigned a document group determination unit 6aa, subsequence search start position determination unit 6ab, and subsequence acquisition unit 6ac.

Upon receipt of the document number subsequence acquisition request 7b from the document retrieval managing unit 5, the assigned document group determination means 6aa calculates the number of assigned documents per unit by dividing the total number of documents by the number of units in parallel processing. Further, the assigned document group determination unit 6aa determines the document group of the sequence corresponding to the apparatus number of a preset local apparatus as an assigned document group 7c, when document data in the document DB 1 is compiled to sequentially define sets each with the number of assigned documents in ascending order of document number.

The subsequence search start position determination unit 6ab references document number subsequence search start address tables in the document number subsequence search start address table storage device to extract the subsequence search start address corresponding to the assigned document group start document number registered in the sequence in accordance with the apparatus number of the local apparatus from among a plurality of subsequence search start addresses associated with keyword strings corresponding to a retrieval keyword.

The subsequence acquisition unit 6ac references the transposed index in the transposed index storage device 2, searches for the document number array in ascending order from the position indicated by a subsequence search start address 7d extracted by the subsequence search start position determination unit 6ab, acquires document numbers contained in the assigned document group 7c in the document number array associated with keyword strings corresponding to the retrieval keyword, and transmits a set of the acquired document numbers to the document retrieval managing unit 5 as the document number subsequences 7e.

The other document number subsequence acquisition apparatuses 6b, 6c, and 6d are also configured like the document number subsequence acquisition apparatus 6a.

According to such a document retrieval system, when the document retrieval request 7a from the retrieval request apparatus 4 is input into the document retrieval managing unit 5, the document number subsequence acquisition request 7b is transmitted to each of the plurality of document number subsequence acquisition apparatuses 6a, 6b, 6c, and 6d by the document number subsequence acquisition request unit 5a. Then, when document data in the document DB 1 is compiled to sequentially define sets each with the number of assigned documents in ascending order of document number, the document group of the sequence corresponding to the apparatus number of a preset local apparatus is determined as the assigned document group 7c by the assigned document group determination unit 6aa of the document number subsequence acquisition apparatus 6a. Next, the subsequence search start address 7d corresponding to the assigned document group start document number registered with the sequence in accordance with the apparatus number of the local apparatus is extracted from among a plurality of subsequence search start addresses associated with keyword strings corresponding to a retrieval keyword by the subsequence search start position determination unit 6ab of the document number subsequence acquisition apparatus 6a. Further, the document number array is searched in ascending order from the position indicated by the extracted subsequence search start address 7d, document numbers contained in the assigned document group 7c in the document number array associated with the keyword strings corresponding to the retrieval keyword are acquired, and a set of the acquired document numbers is transmitted to the document retrieval managing unit 5 as the document number subsequences 7e by the subsequence acquisition unit 6ac of the document number subsequence acquisition apparatus 6a. Similarly, document number subsequences are also transmitted from the document number subsequence acquisition apparatuses 6b, 6c, and 6d to the document retrieval managing unit 5.

Document number subsequences returned from the plurality of document number subsequence acquisition apparatuses are acquired and document numbers contained in the document number subsequences are summarized and a document number array 7f is generated by the document number array summarization unit 5b of the document retrieval managing unit 5. Next, document data corresponding to each document number contained in the document number array 7f is extracted from the document DB 1 by the document list creation unit 5c of the document retrieval managing unit 5 to create the document list 7g. Then, the document list 7g is transmitted to the retrieval request apparatus 4 by the retrieval result notification unit 5d of the document retrieval managing unit 5.

Accordingly, by preparing a plurality of document number subsequence search start address tables for different planned numbers of units of document number subsequence acquisition apparatuses to be operated in parallel, the operations manager needs only to switch the document number subsequence search start address table to be used when the number of document number subsequence acquisition apparatuses to be operated in parallel is changed within the range of planned numbers of units. As a result, the number of document number subsequence acquisition apparatuses can swiftly be changed.

Incidentally, in recent years, users commonly perform document retrieval via the Internet. When a document retrieval service via the Internet is provided, the operation time of the service is often around the clock. In such cases, it is desirable that the system be capable of being enhanced while continuing the service. Thus, embodiments facilitating system enhancement by applying to a document retrieval system via the Internet will be described below in detail.

First Embodiment

Figure 2:
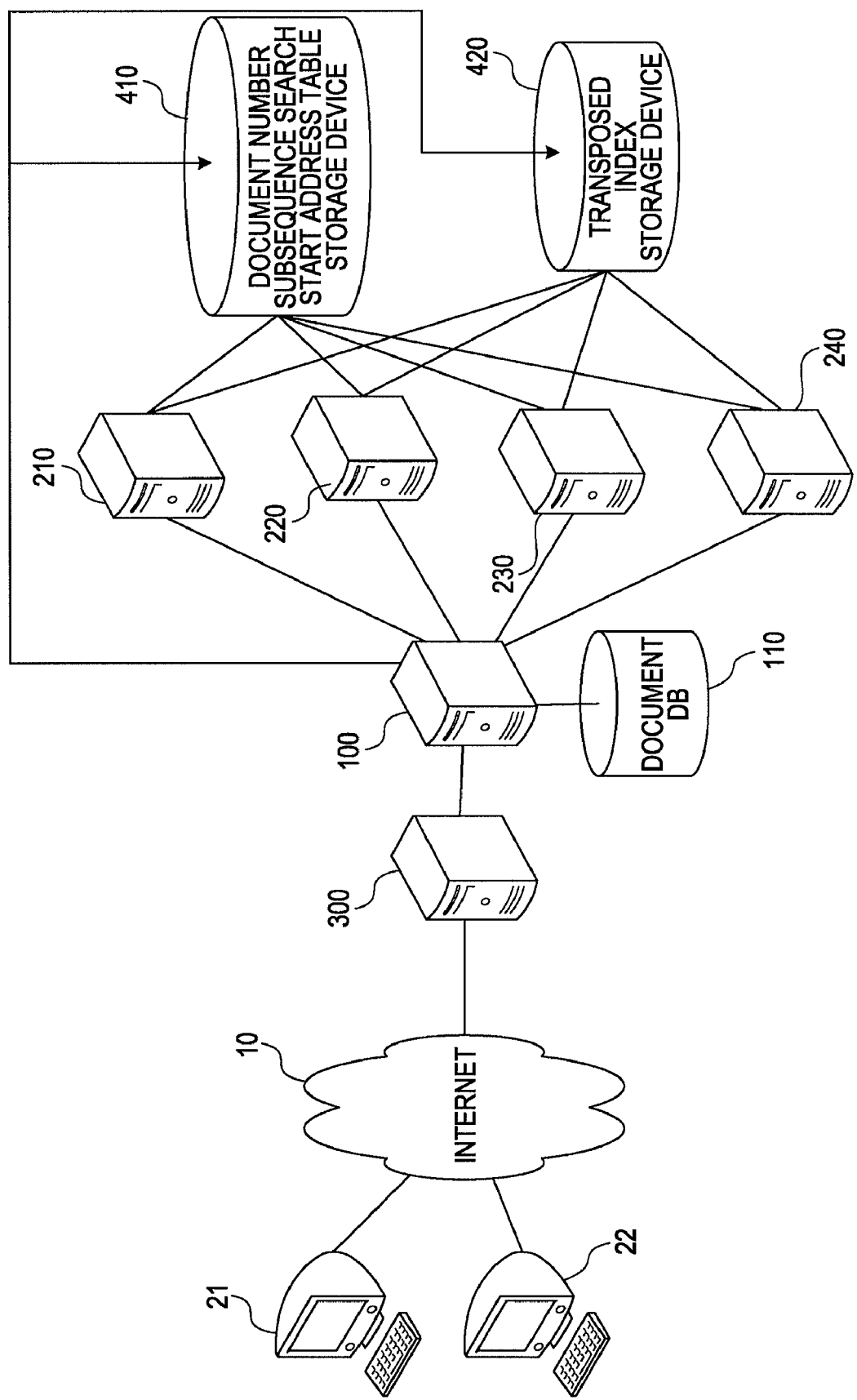
FIG. 2 is a diagram exemplifying a document retrieval system configuration in a first embodiment.

FIG. 2 is a diagram exemplifying a document retrieval system configuration in a first embodiment. In the first embodiment, a Web server 300 is connected to an Internet 10. The Web server 300 provides information to a plurality of clients 21 and 22 via the Internet 10. The Web server 300 corresponds to the retrieval request apparatus 4 shown in FIG. 1.

A document retrieval managing unit 100 is connected to the Web server 300. Then, when retrieval conditions are input from the client 21 or 22 to issue retrieval instructions of documents, the Web server 300 transmits a document retrieval request to a document retrieval managing unit 100.

The document retrieval managing unit 100 has a document database (DB) 110 and, when a document retrieval request from the Web server 300 is input, performs document retrieval in accordance with the document retrieval request. More specifically, the document retrieval managing unit 100 acquires a document number array in accordance with a retrieval keyword contained in retrieval conditions via document number subsequence acquisition apparatuses 210, 220, 230, and 240. Then, the document retrieval managing unit 100 extracts information about documents contained in the acquired document number array from the document DB 110 and transmits the information to the Web server 300 as a retrieval result.

The plurality of document number subsequence acquisition apparatuses 210, 220, 230, and 240 are connected to the document retrieval managing unit 100. A document number subsequence search start address table storage device 410 and a transposed index storage device 420 are connected to the document number subsequence acquisition apparatuses 210, 220, 230, and 240.

Document number subsequence search start address tables are stored in the document number subsequence search start address table storage device 410. In a document number subsequence search start address table, a subsequence search start address used by each of the document number subsequence acquisition apparatuses 210, 220, 230, and 240 for acquiring document numbers from a transposed index in the transposed index storage device 420 is set for each keyword string. The subsequence search start address indicates the position where an assigned document group start document number is recorded in an array of document numbers mapped to each of the keyword strings in the transposed index.

The assigned document group start document number is a document number of start document data containing a corresponding keyword string in each assigned document group when an assigned document group is assigned to each of the plurality of document number subsequence acquisition apparatuses. At least as many assigned document group start document numbers as the assumed number of units planned for parallel operation of document number subsequence acquisition apparatuses are defined. If an individual document number subsequence search start address table is created for each number of units planned for parallel operation (if the document number subsequence search start address table to be used is always changed when the number of units simultaneously in operation is changed), only as many assigned document group start document numbers as the number of units planned for parallel operation need to be defined.

The transposed index is stored in the transposed index storage device 420. In a transposed index, an array of document numbers (document number array) of documents containing the keyword string is registered for each keyword string.

In response to a document number subsequence acquisition request from the document retrieval managing unit 100, the document number subsequence acquisition apparatuses 210, 220, 230, and 240 acquire subsequences of a document number array from the transposed index storage device 420. A different apparatus number is attached to each of the document number subsequence acquisition apparatuses 210, 220, 230, and 240 in advance. The apparatus number is an integer starting with 0. In the example shown in FIG. 2, the apparatus number of the document number subsequence acquisition apparatus 210 is "0", that of the document number subsequence acquisition apparatus 220 is "1", that of the document number subsequence acquisition apparatus 230 is "2", and that of the document number subsequence acquisition apparatus 240 is "3". Based on the apparatus number, document groups to be retrieved by each of the document number subsequence acquisition apparatuses 210, 220, 230, and 240 are determined.

The document number subsequence acquisition apparatuses 210, 220, 230, and 240 reference document number subsequence search start address tables stored in the document number subsequence search start address table storage device 410 to acquire the search start address of document number subsequences to be acquired by each apparatus based on the apparatus number of each apparatus. Then, each of the document number subsequence acquisition apparatuses 210, 220, 230, and 240 acquires a predetermined range of document number subsequences from a transposed index starting from the individual search start address.

When, in such a document retrieval system, a retrieval request containing retrieval conditions from the client 21 or 22 is transmitted to the Web server 300, the retrieval conditions are delivered to the document retrieval managing unit 100. The retrieval conditions include one or more retrieval keywords. Then, the document retrieval managing unit 100 transmits a document number subsequence acquisition request to each of the document number subsequence acquisition apparatuses 210, 220, 230, and 240.

Each of the document number subsequence acquisition apparatuses 210, 220, 230, and 240 recognizes the search start address thereof based on the document number subsequence search start address table stored in the document number subsequence search start address table storage device 410. Then, each of the document number subsequence acquisition apparatuses 210, 220, 230, and 240 acquires subsequences of a document number array from the search start address in a transposed index in the transposed index storage device 420. Document number subsequences (the subsequences of the document number array) acquired by the document number subsequence acquisition apparatuses 210, 220, 230, and 240 are delivered to the document retrieval managing unit 100.

The document retrieval managing unit 100 summarizes document number subsequences acquired from the document number subsequence acquisition apparatuses 210, 220, 230, and 240 and reorganizes document number arrays registered with transposed indexes stored in the transposed index storage device 420. Next, the document retrieval managing unit 100 acquires information about documents corresponding to part or all document numbers contained in the document number arrays from the document DB 110. Then, the document retrieval managing unit 100 delivers acquired document data to the Web server 300 as a retrieval result.

The Web server 300 arranges a retrieval result received from the document retrieval managing unit 100 in document data (for example, in an HTML (HyperText Markup Language) document) for Web pages before transmitting the retrieval result to the client that has output the retrieval request.

The document retrieval service of documents stored in the document DB 110 is provided in this manner to the clients 21 and 22.

Figure 3:
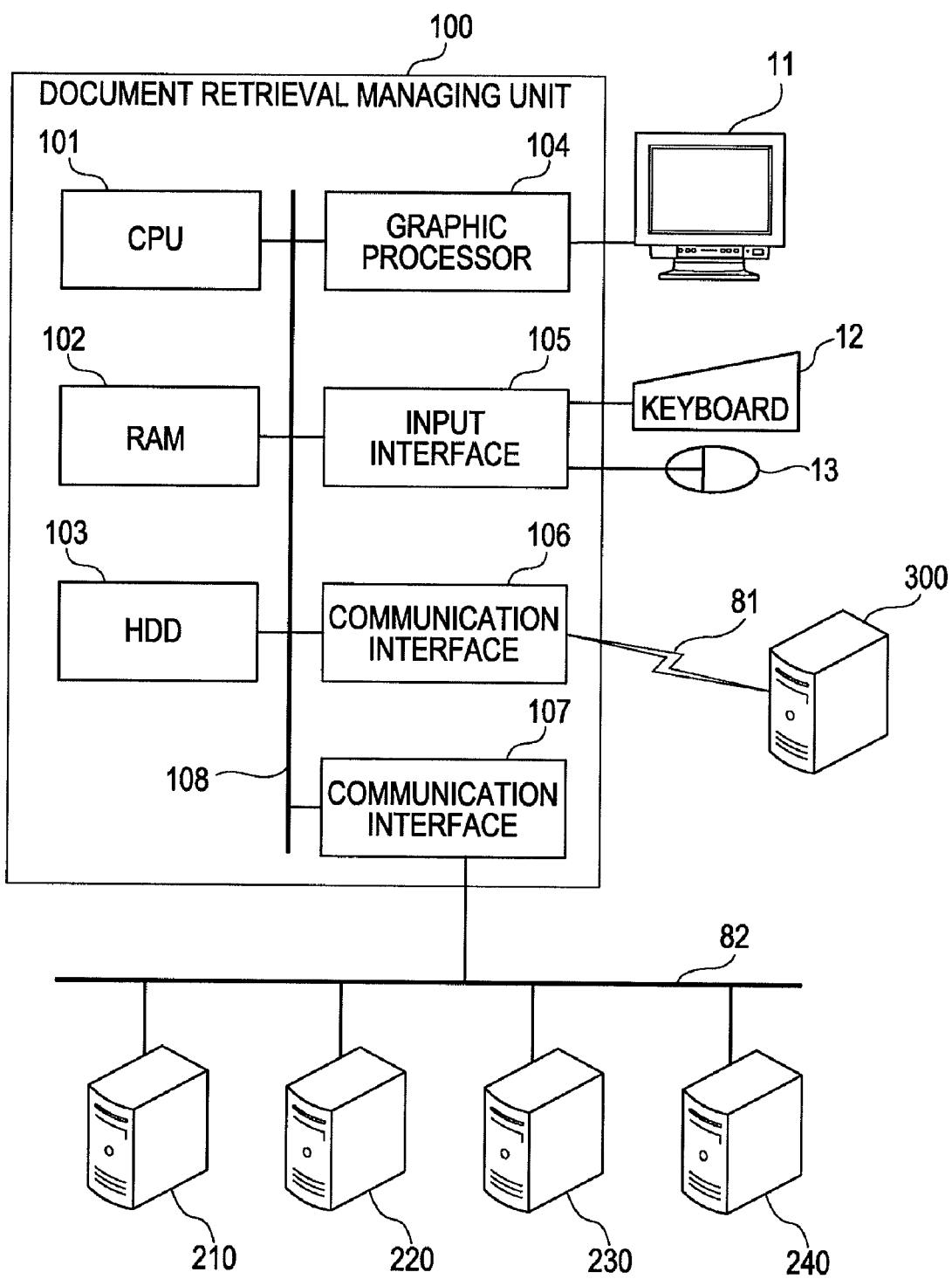
FIG. 3 is a diagram exemplifying a hardware configuration of a document retrieval managing unit used in the first embodiment.

FIG. 3 is a diagram exemplifying a hardware configuration of the document retrieval managing unit used in the first embodiment. The document retrieval managing unit 100 is controlled as a whole by a CPU (Central Processing Unit) 101. A RAM (Random Access Memory) 102, a hard disk drive (HDD) 103, a graphic processor 104, an input interface 105, and a communication interface 106 are connected to the CPU 101 via a bus 108.

At least a part of OS (Operating System) programs and application programs for which the CPU 101 is caused to execute is temporarily stored in the RAM 102. Also, various kinds of data needed for processing by the CPU 101 are stored in the RAM 102. OS and application programs are stored in the HDD 103.

A monitor 11 is connected to the graphic processor 104. The graphic processor 104 causes a screen of the monitor 11 to display images according to instructions from the CPU 101. A keyboard 12 and a mouse 13 are connected to the input interface 105. The input interface 105 transmits signals transmitted from the keyboard 12 or the mouse 13 to the CPU 101 via the bus 108.

The communication interface 106 is connected to a network 81. The communication interface 106 exchanges data with the Web server 300 via the network 81.

A communication interface 107 is connected to a network 82. The communication interface 107 exchanges data with the document number subsequence acquisition apparatuses 210, 220, 230, and 240 via the network 82.

With the hardware configuration described above, processing functions in the present embodiment can be realized. Incidentally, FIG. 3 shows the hardware configuration of the document retrieval managing unit 100, and the document number subsequence acquisition apparatuses 210, 220, 230, and 240, the Web server 300, and the clients 21 and 22 can also be realized by a similar configuration.

Figure 4:
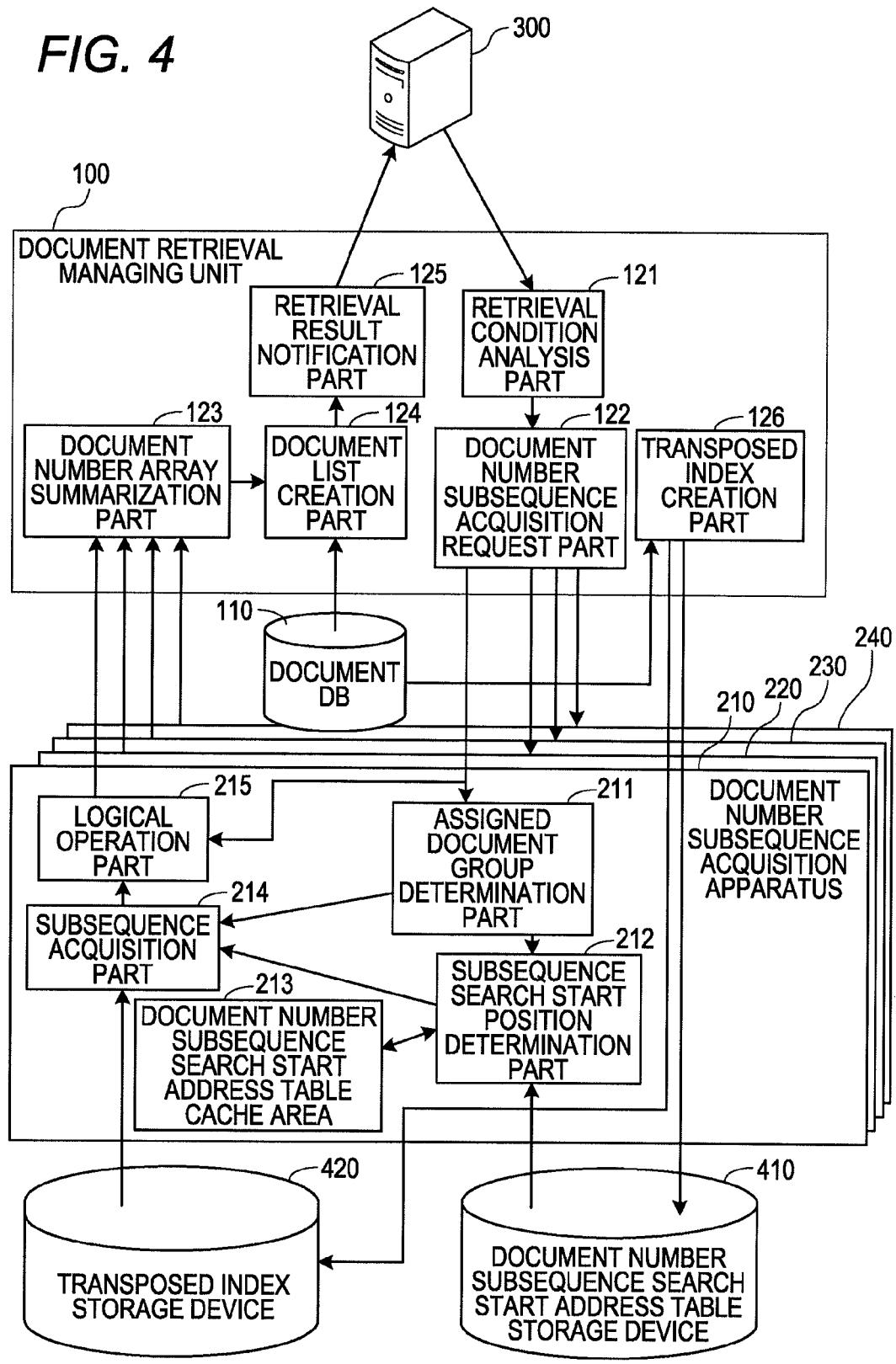
FIG. 4 is a block diagram showing document retrieval functions in the first embodiment.

FIG. 4 is a block diagram showing document retrieval functions in the first embodiment. As shown in FIG. 4, the document retrieval managing unit 100 has a retrieval condition analysis part 121, a document number subsequence acquisition request part 122, a document number array summarization part 123, a document list creation part 124, a retrieval result notification part 125, and a transposed index creation part 126.

Upon receipt of a document retrieval request containing retrieval conditions from the Web server 300, the retrieval condition analysis part 121 analyzes the retrieval conditions contained in the document retrieval request. More specifically, the retrieval condition analysis part 121 extracts a retrieval keyword from the retrieval conditions. Then, the retrieval condition analysis part 121 delivers the retrieval keyword to the document number subsequence acquisition request part 122. If a plurality of retrieval keywords and logical operators is contained in the retrieval conditions, the retrieval condition analysis part 121 delivers pairs of the plurality of retrieval keywords and logical operators extracted from the retrieval conditions to the document number subsequence acquisition request part 122. A logical operator is information shows a logical addition (OR) or a logical product (AND).

The document number subsequence acquisition request part 122 transmits a document number subsequence acquisition request containing the retrieval keyword delivered by the retrieval condition analysis part 121 to each of the document number subsequence acquisition apparatuses 210, 220, 230, and 240. If pairs of the plurality of retrieval keywords and logical operators are delivered by the retrieval condition analysis part 121, the document number subsequence acquisition request part 122 transmits a document number subsequence acquisition request containing the plurality of retrieval keywords and logical operators to each of the document number subsequence acquisition apparatuses 210, 220, 230, and 240.

The document number array summarization part 123 acquires subsequences of document number arrays transmitted from each of the document number subsequence acquisition apparatuses 210, 220, 230, and 240 in accordance with a document number subsequence acquisition request. Next, the document number array summarization part 123 summarizes acquired document number subsequences to generate a document number array in accordance with the retrieval keyword. Then, the document number array summarization part 123 delivers the generated document number array to the document list creation part 124.

The document list creation part 124 acquires a document number array of the retrieval keyword delivered by the document number array summarization part 123. Then, the document list creation part 124 acquires document data corresponding to document numbers contained in the document number array from the document DB 110.

The document list creation part 124 creates a document list based on the acquired document data. The document list contains, for example, document titles, document URLs, and strings of sentences containing a retrieval keyword. Then, the document list creation part 124 delivers the created document list to the retrieval result notification part 125.

The retrieval result notification part 125 transmits a document list received from the document list creation part 124 to the Web server 300.

Upon receipt of a creation instruction of a transposed index by operational input or the like from an operations manager, the transposed index creation part 126 acquires document data from the document DB 110 to create a transposed index and a document number subsequence search start address table. The transposed index creation part 126 stores the created transposed index in the transposed index storage device 420 and the created document number subsequence search start address table in the document number subsequence search start address table storage device 410.

The document number subsequence acquisition apparatus 210 includes an assigned document group determination part 211, a subsequence search start position determination part 212, a document number subsequence search start address table cache area 213, a subsequence acquisition part 214, and a logical operation part 215.

Upon receipt of a document number subsequence acquisition request containing a retrieval keyword from the document retrieval managing unit 100, the assigned document group determination part 211 extracts the greatest value of the document number and the number of document number subsequence acquisition apparatuses in operation from the document number subsequence acquisition request. Then, the assigned document group determination part 211 determines the assigned document group to be retrieved based on the apparatus number of the document number subsequence acquisition apparatus 210 itself. The assigned document group is indicated by a subsequence start document number and a subsequence end document number. Documents corresponding to the subsequence start document number and subsequence end document number are to be retrieved. The assigned document group determination part 211 notifies the subsequence acquisition part 214 of the determined document group to be retrieved.

Upon receipt of a document number subsequence acquisition request containing a retrieval keyword from the document retrieval managing unit 100, the subsequence search start position determination part 212 compares the document number subsequence search start address table in the document number subsequence search start address table storage device 410 and that stored in the document number subsequence search start address table cache area 213 to determine whether the latest document number subsequence search start address table is stored in the document number subsequence search start address table cache area 213. If the document number subsequence search start address table stored in the document number subsequence search start address table cache area 213 is not the latest one, the subsequence search start position determination part 212 acquires the document number subsequence search start address table from the document number subsequence search start address table storage device 410 to store the document number subsequence search start address table in the document number subsequence search start address table cache area 213.

Further, the subsequence search start position determination part 212 references the document number subsequence search start address table storage device 410 to acquire the subsequence search start address to be acquired by the document number subsequence acquisition apparatus 210. More specifically, the apparatus number of the document number subsequence acquisition apparatus 210 is held in advance in the subsequence search start position determination part 212. The subsequence search start position determination part 212 retrieves keyword strings corresponding to a retrieval keyword in the document number subsequence search start address table stored in the document number subsequence search start address table storage device 410. Next, the subsequence search start position determination part 212 acquires the subsequence search start address corresponding to the apparatus number of the document number subsequence acquisition apparatus 210 from a list of subsequence search start addresses mapped to the detected keyword strings. Then, the subsequence search start position determination part 212 delivers the acquired subsequence search start address to the subsequence acquisition part 214.

The document number subsequence search start address table cache area 213 is a storage area for storing a document number subsequence search start address table. For example, a portion of storage area of the RAM of the document number subsequence acquisition apparatus 210 is used as the document number subsequence search start address table cache area 213.

The subsequence acquisition part 214 acquires a predetermined number of document numbers (document number subsequences) from transposed indexes in the transposed index storage device 420. The start address of document number subsequences acquired by the subsequence acquisition part 214 is indicated by the subsequence search start address delivered by the subsequence search start position determination part 212. The subsequence acquisition part 214 extracts only document numbers belonging to the assigned document group from among the acquired document numbers and delivers these document numbers to the logical operation part 215.

If any logical operator is contained in a document number subsequence acquisition request transmitted from the document retrieval managing unit 100, the logical operation part 215 acquires the logical operator. Then, after receiving document number subsequences corresponding to each of a plurality of retrieval keywords contained in the document number subsequence acquisition request from the subsequence acquisition part 214, the logical operation part 215 integrates the acquired document number subsequences according to the logical operator.

More specifically, the logical operation part 215 determines content of the logical operator contained in the document number subsequence acquisition request. If the logical operator is the logical addition (OR), the logical operation part 215 creates an array of document numbers contained in at least one document number subsequence of each of the plurality of retrieval keywords, which will be set as the document number subsequences in accordance with the document number subsequence acquisition request. If the logical operator is the logical product (AND), the logical operation part 215 creates an array of document numbers contained in both document number arrays of each of the plurality of retrieval keywords, which will be set as the document number subsequences in accordance with the document number subsequence acquisition request.

The logical operation part 215 transmits document number subsequences in accordance with a document number subsequence acquisition request to the document retrieval managing unit 100. If the document number subsequence acquisition request contains only one retrieval keyword and no logical operator, the logical operation part 215 transmits document number subsequences acquired by the subsequence acquisition part 214 in accordance with the retrieval keyword to the document retrieval managing unit 100 as the document number subsequences in accordance with the document number subsequence acquisition request.

Though FIG. 4 shows only functions of the document number subsequence acquisition apparatus 210, the other document number subsequence acquisition apparatuses 220, 230, and 240 also have similar functions.

Logical operations when a plurality of retrieval keywords are contained in the retrieval conditions can be performed also in the document retrieval managing unit 100. For example, logical operators extracted by the retrieval condition analysis part 121 are acquired by the document list creation part 124. Then, the document list creation part 124 integrates document number arrays acquired in accordance with each of the retrieval keywords in accordance with the logical operators. The integration method is similar to processing by the logical operation part 215. Then, the document list creation part 124 acquires document data in accordance with a document number array after integration from the document DB 100.

Though it is possible for the document retrieval managing unit 100 to perform logical operation, as described above, it is more efficient to perform logical operations in the document number subsequence acquisition apparatuses 210, 220, 230, and 240 like in the present embodiment. That is, the amount of data to be transmitted can be reduced by logical operations being performed by the document number subsequence acquisition apparatuses 210, 220, 230, and 240 and integrated document number subsequences being transmitted to the document retrieval managing unit 100 by each of the document number subsequence acquisition apparatuses 210, 220, 230, and 240.

Next, data structures of each kind of data used by a document retrieval system will be described.

Figure 5:
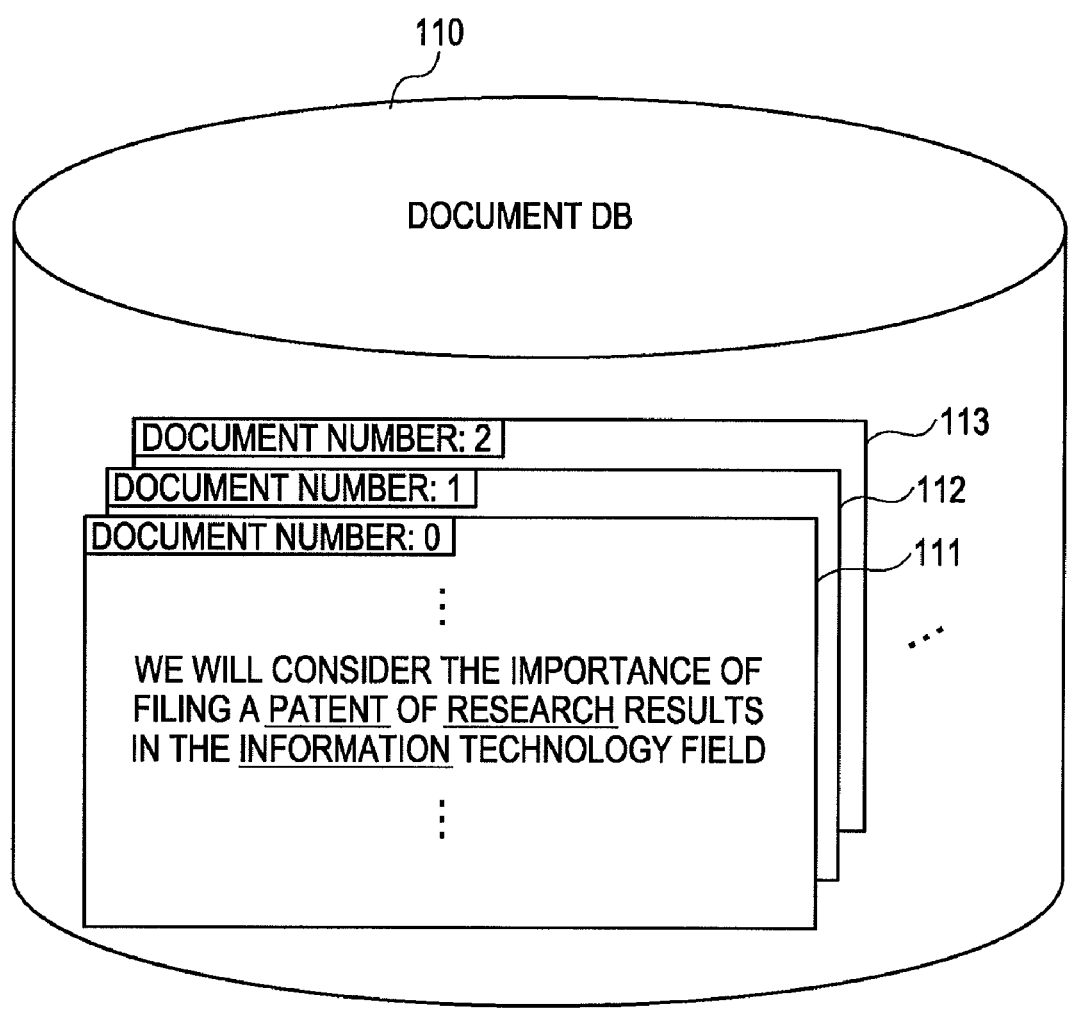
FIG. 5 is a diagram exemplifying a data structure of a document database.

FIG. 5 is a diagram exemplifying a data structure of a document database. A plurality of pieces of data 111, 112, 113, . . . is stored in the document DB 110. The document data 111, 112, 113, . . . contains strings indicating content of each document. In addition, a document number is attached to each piece of the document data 111, 112, 113, . . . .

If the document data 111, 112, 113, . . . is content collected via the Internet 10, the document data 111, 112, 113, . . . includes URLs of collection sources. If any title is attached to the document data 111, 112, 113, . . . , information indicating that a string indicating a title is a title is attached by, for example, a predetermined tag.

Figure 6:
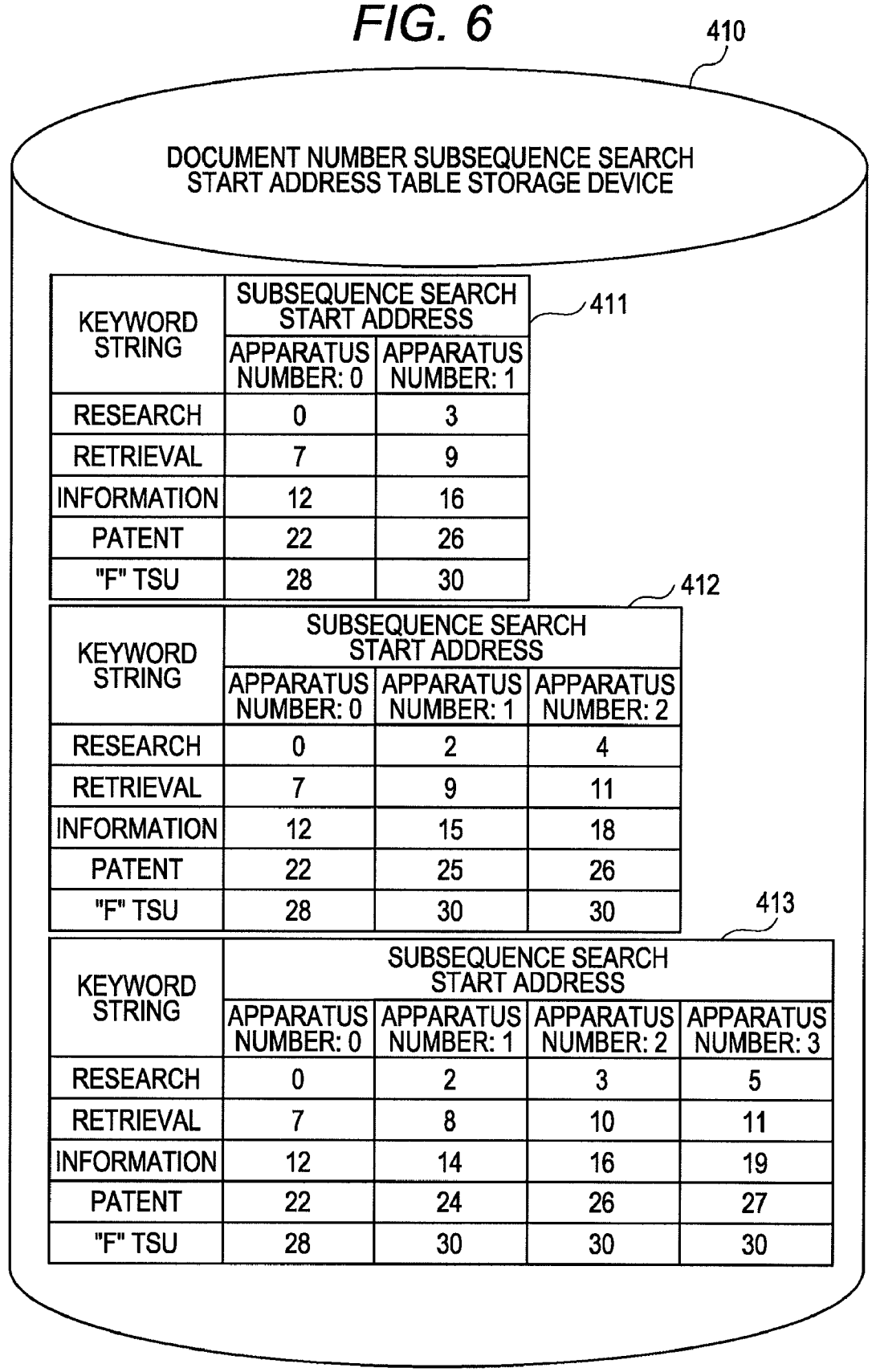
FIG. 6 is a diagram exemplifying a data structure of a document number subsequence search start address table storage device.

FIG. 6 is a diagram exemplifying the data structure of a document number subsequence search start address table storage device. In the document number subsequence search start address table storage device 410, a plurality of document number subsequence search start address tables 411, 412, and 413 in accordance with the number of document number subsequence acquisition apparatuses to be operated is stored. For example, the document number subsequence search start address table 411 is used when two units of document number subsequence acquisition apparatus are used. The document number subsequence search start address table 412 is used when three units of document number subsequence acquisition apparatus are used, and the document number subsequence search start address table 413 is used when four units of document number subsequence acquisition apparatus are used.

In each of the document number subsequence search start address tables 411, 412, and 413, fields of the keyword string and subsequence search start address are provided. For the keyword string field, strings that can be specified as a retrieval keyword are set. In the subsequence search start address field, the subsequence search start address for each apparatus number is set by mapping to a keyword string. The subsequence search address is a numerical value (address) indicating what number in a document number array registered with a transposed index corresponds to a document number at the search start position.

Figure 7:
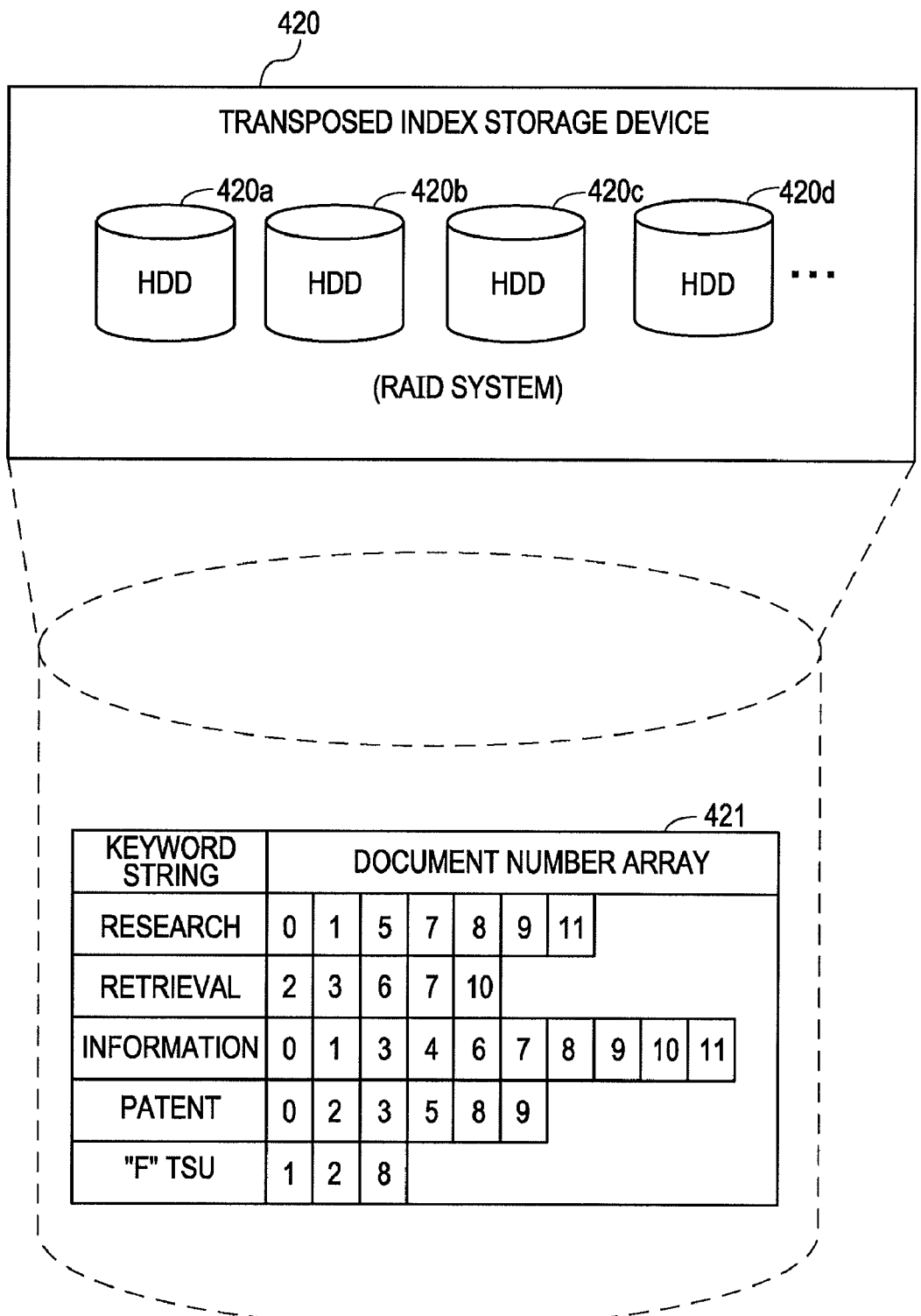
FIG. 7 is a diagram exemplifying an internal structure and a data structure of a transposed index storage device.

FIG. 7 is a diagram exemplifying an internal structure and the data structure of a transposed index storage device. The transposed index storage device 420 comprises a plurality of HDDs 420a, 420b, 420c, 420d, . . . . Then, the transposed index storage device 420 constitutes a RAID (Redundant Arrays of Inexpensive Disks) system by these HDDs 420a, 420b, 420c, 420d, . . . .

The transposed index storage device 420 performs at least striping to distributively store data in the plurality of HDDs 420a, 420b, 420c, 420d, . . . . For example, technology such as RAID 5 is used. Then, a transposed index 421 is stored in the transposed index storage device 420 having such a RAID system configuration.

In the transposed index 421, document number arrays are registered by associating them with each keyword string. Addresses are preferentially allocated to document numbers contained in a document number array of each keyword string from keyword strings registered with high positions in the transposed index 421. In a document number array of a keyword string, addresses are sequentially allocated from left to right.

Though only twelve documents whose document number is "0" to "11" are registered in the example shown in FIG. 7, several million or more documents are actually registered in the document DB 110. Then, based on keyword strings contained in each document, a vast amount of document number arrays is registered with transposed indexes.

However, since it is easier to understand a description of document retrieval processing using an example in which the number of documents is small, the example shown in FIG. 7 will also be referenced in descriptions that follow when appropriate.

Figure 8:
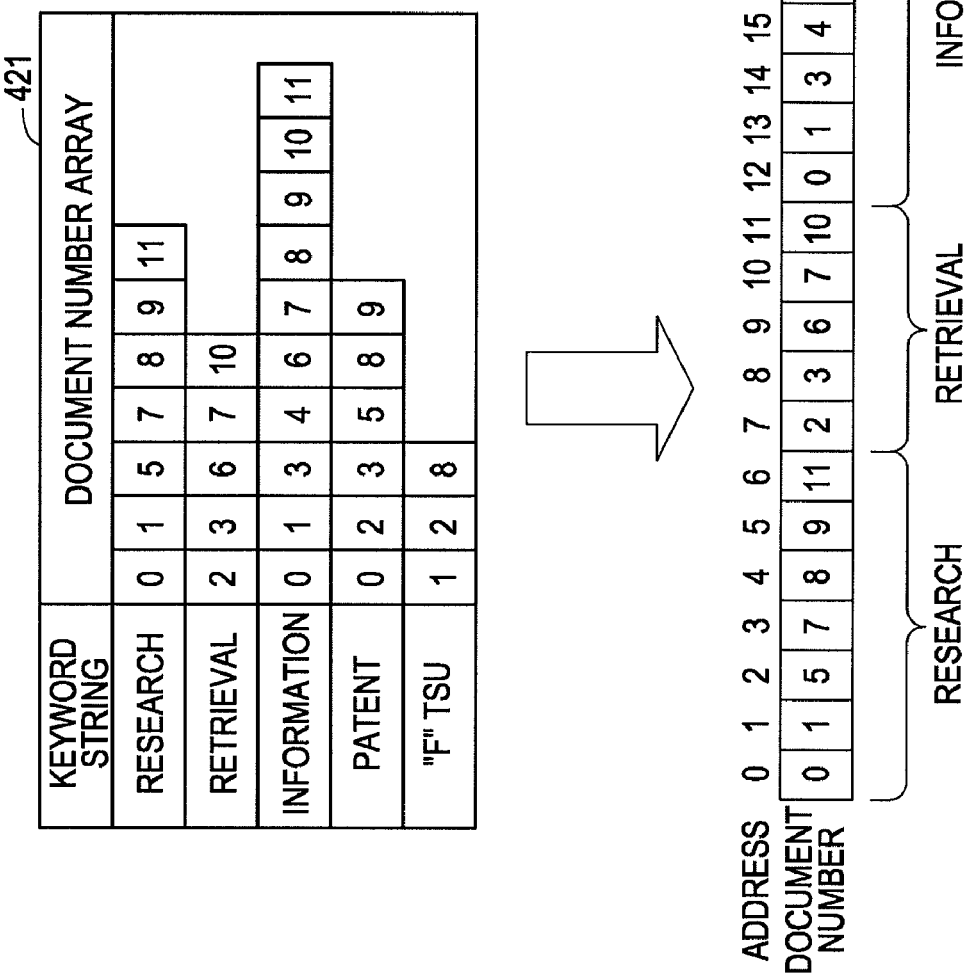
FIG. 8 is a diagram showing relationships between a document number array and addresses.

FIG. 8 is a diagram showing relationships between a document number array and addresses. As shown in FIG. 8, addresses beginning with 0 are allocated sequentially from document numbers contained in a document number array of the keyword string "Research" registered in the highest position of the transposed index 421.

That is, since seven document numbers of documents containing the keyword string "Research" are registered, addresses ranging from "0" to "6" are allocated to each document number. "Retrieval" is registered after the keyword string "Research". Therefore, addresses beginning with "7" are allocated to document numbers of documents containing the keyword string "Retrieval" in order.

Document retrieval processing is performed based on the configuration described above.

Figure 9:
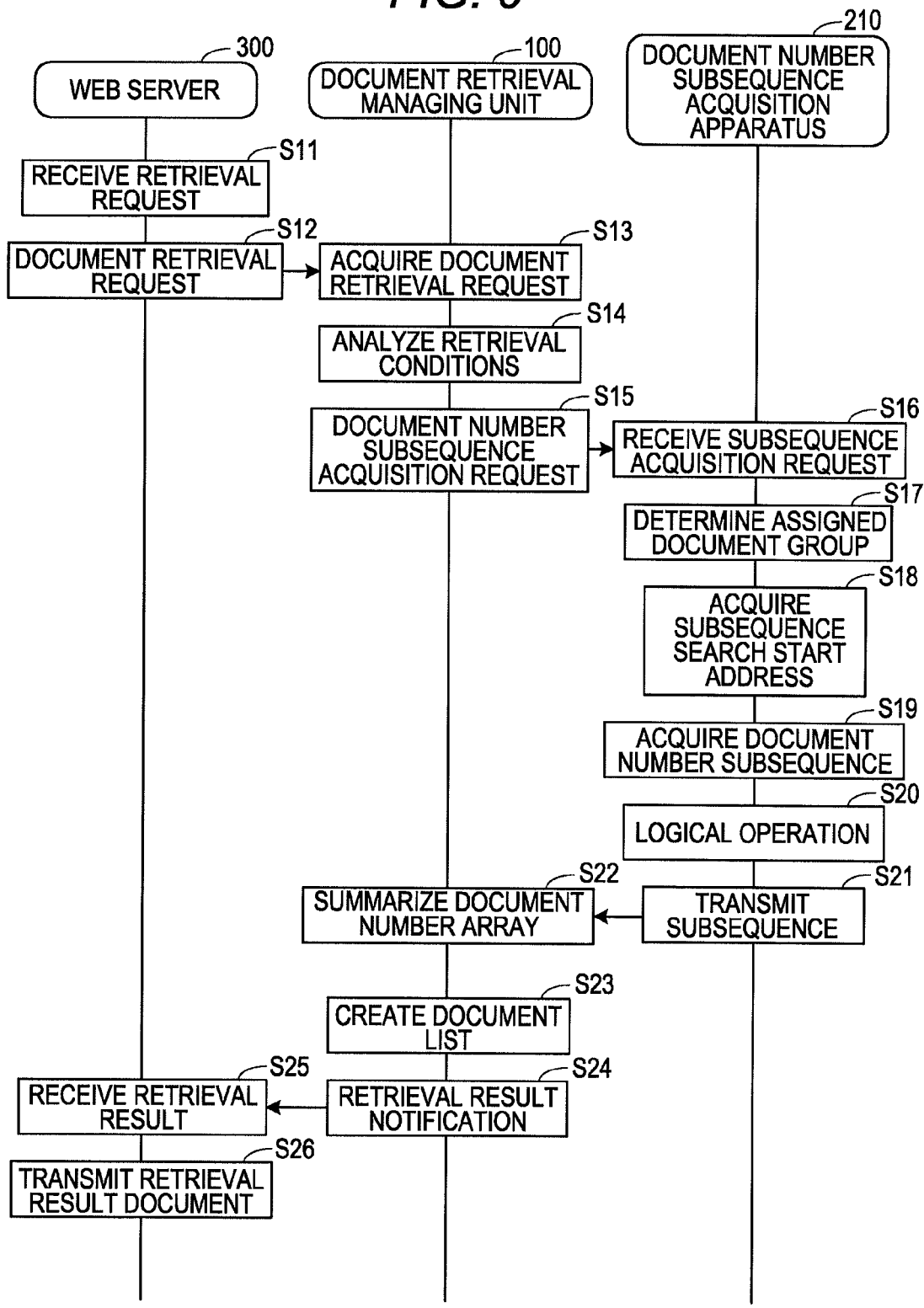
FIG. 9 is a sequence diagram showing a procedure for document retrieval processing.

FIG. 9 is a sequence diagram showing a procedure for document retrieval processing. Processing shown in FIG. 9 will be described below by following step numbers. Though FIG. 9 shows processing by the document number subsequence acquisition apparatus 210 as being a representative, processing by the other document number subsequence acquisition apparatuses 220, 230, and 240 is similar to that by the document number subsequence acquisition apparatus 210.

[Step S11] The web server 300 receives a retrieval request from the client 21 or 22.

[Step S12] Then, the Web server 300 makes a request of document retrieval according to retrieval conditions shown in the retrieval request to the document retrieval managing unit 100.

[Step S13] In the document retrieval managing unit 100, the retrieval condition analysis part 121 acquires the document retrieval request.

[Step S14] The retrieval condition analysis part 121 analyzes the retrieval conditions contained in the document retrieval request to extract one or more retrieval keywords. If any logical operator is contained in the retrieval conditions, the retrieval condition analysis part 121 also extracts the logical operator. The retrieval condition analysis part 121 delivers the extracted retrieval keywords and logical operator to the document number subsequence acquisition request part 122.

[Step S15] The document number subsequence acquisition request part 122 transmits the document number subsequence acquisition request delivered from the retrieval condition analysis part 121 to each of the four document number subsequence acquisition apparatuses 210, 220, 230, and 240. At this point, the document number subsequence acquisition request part 122 references the document DB 110 to acquire the document number of the document registered last (document number maximum value). Then, the document number subsequence acquisition request part 122 attaches the document number maximum value and the number of document number subsequence acquisition apparatuses in operation (number of units in parallel processing) to the document number subsequence acquisition request before delivering the request to each of the document number subsequence acquisition apparatuses 210, 220, 230, and 240.

In the present embodiment, the document number begins with 0. Thus, the value obtained by adding 1 to the document number maximum value will be the total number of pieces of document data registered with the document DB 110 so that the total number of documents can easily be derived from the document number maximum value. That is, the total number of documents and the document number maximum value are technically equivalent.

[Step S16] The assigned document group determination part 211 of the document number subsequence acquisition apparatus 210 receives the document number subsequence acquisition request from the document retrieval managing unit 100.

[Step S17] The assigned document group determination part 211 determines the range of assigned document numbers of document number subsequences to be acquired. More specifically, the assigned document group determination part 211 divides the number obtained by adding 1 to the document number of the document registered last (document number maximum value) by the number of units in parallel processing. The number of assigned documents per unit is thereby determined.

Next, the assigned document group determination part 211 defines a result obtained by multiplying the number of assigned documents per unit by the apparatus number of the document number subsequence acquisition apparatus 210 itself as the subsequence start document number of the assigned document group. A calculation formula can be expressed as follows.

Subsequence start document number=number of assigned documents per unit of document number subsequence acquisition apparatus×apparatus number of the focused document number subsequence acquisition apparatus.

Further, the assigned document group determination part 211 defines a value obtained by multiplying the number of assigned documents per unit by the value obtained by adding 1 to the apparatus number of the document number subsequence acquisition apparatus 210 itself and subtracting 1 from a multiplication result as the subsequence end document number of the assigned document group. A calculation formula can be expressed as follows.

Subsequence end document number=number of assigned documents per unit of document number subsequence acquisition apparatus×(apparatus number+1)−1

Accordingly, the subsequence start document number and subsequence end document number of the document group to be assigned to the document number subsequence acquisition apparatus 210 are determined. Since four units of the document number subsequence acquisition apparatuses 210, 220, 230, and 240 are in operation in the present embodiment, if the document number maximum value is "11" like the example shown in FIG. 7, the number of assigned documents per unit will be "3" (12÷4).

The apparatus number of the document number subsequence acquisition apparatus 210 is "0". The subsequence start document number of the apparatus number of the document number subsequence acquisition apparatus 210 is "0" (3×0). The subsequence end document number of the apparatus number of the document number subsequence acquisition apparatus 210 is "2" (3×1−1). That is, the document group assigned to the document number subsequence acquisition apparatus 210 include documents whose document number ranges from "0" to "2".

Similar calculations can be performed for each of the other document number subsequence acquisition apparatuses 220, 230, and 240. As a result, the document group assigned to the document number subsequence acquisition apparatus 220 (apparatus number "1") include documents whose document number ranges from "3" to "5". The document group assigned to the document number subsequence acquisition apparatus 230 (apparatus number "2") include documents whose document number ranges from "6" to "8". The document group assigned to the document number subsequence acquisition apparatus 240 (apparatus number "3") include documents whose document number ranges from "9" to "11".

The assigned document group determination part 211 delivers information specifying assigned document groups (the subsequence start document number and subsequence end document number) to the subsequence acquisition part 214.

[Step S18] The subsequence search start position determination part 212 acquires the subsequence search start address from the document number subsequence search start address table storage device 410.

More specifically, the subsequence search start position determination part 212 first determines whether the document number subsequence search start address table stored in the document number subsequence search start address table cache area 213 is the latest one corresponding to the number of units in parallel processing. For this purpose, the subsequence search start position determination part 212 first determines whether the document number subsequence search start address table stored in the document number subsequence search start address table cache area 213 corresponds to the number of units in parallel processing specified by the document retrieval managing unit 100. For example, the subsequence search start position determination part 212 can determine that the document number subsequence search start address table corresponds to the number of units in parallel processing if the type of apparatus number set in the subsequence search start address field matches the number of units in parallel processing.

If the document number subsequence search start address table corresponding to the number of units in parallel processing is stored in the document number subsequence search start address table cache area 213, the subsequence search start position determination part 212 subsequently acquires the update date/time of the document number subsequence search start address table (the document number subsequence search start address table 413 in the present embodiment) stored in the document number subsequence search start address table storage device 410 (The update date/time can be acquired from the file system in the OS). Then, the subsequence search start position determination part 212 determines whether the acquired update date/time matches that of the document number subsequence search start address table stored in the document number subsequence search start address table cache area 213.

If both update dates/times match, the document number subsequence search start address table in the document number subsequence search start address table cache area 213 can be determined to be the latest one. If both update dates/times do not match, the document number subsequence search start address table in the document number subsequence search start address table cache area 213 is determined not to be the latest one.

If the document number subsequence search start address table in the document number subsequence search start address table cache area 213 is the latest one corresponding to the number of units in parallel processing, the document number subsequence search start address table can be used without being changed. If the document number subsequence search start address table in the document number subsequence search start address table cache area 213 does not correspond to the number of units in parallel processing or is not the latest one, the subsequence search start position determination part 212 acquires the document number subsequence search start address table corresponding to the number of units in parallel processing from the document number subsequence search start address table storage device 410 and stores the address table in the document number subsequence search start address table cache area 213. At this point, the update date/time of the document number subsequence search start address table 413 is also stored in the document number subsequence search start address table cache area 213.

Subsequently, the subsequence search start position determination part 212 references the document number subsequence search start address table in the document number subsequence search start address table cache area 213 to acquire the subsequence search start address for the apparatus number "0" of the document number subsequence acquisition apparatus 210 from among subsequence search start addresses associated with keyword strings corresponding to the retrieval keyword. If, for example, the retrieval keyword is "information", the subsequence search start address of the document number subsequence acquisition apparatus 210 will be "12" (See FIG. 6). The acquired subsequence search start address is delivered to the subsequence acquisition part 214.

Incidentally, in the example shown in FIG. 6, an apparatus number is mapped to each subsequence search address in the document number subsequence search start address tables 411, 412, and 413, but no apparatus number may be set in the document number subsequence search start address tables 411, 412, and 413. In that case, each document number subsequence acquisition apparatus acquires the subsequence search start address in the sequence in accordance with its apparatus number from among subsequence search start addresses mapped to the keyword string. In the example shown in FIG. 6, the left side in an array of subsequence search start addresses is the start and the document number subsequence acquisition apparatus with the apparatus number "0" is the first in the sequence.

[Step S19] The subsequence acquisition part 214 acquires subsequences of a document number array from the transposed index storage device 420. More specifically, the subsequence acquisition part 214 references the transposed index 421 in the transposed index storage device 420 to extract document numbers in order (ascending order) from the subsequence search start address. Then, the subsequence acquisition part 214 acquires only document numbers contained in the assigned document group as the document number subsequence.

When the extracted document number becomes larger than the subsequence end document number, the subsequence acquisition part 214 terminates extraction processing of document numbers.

[Step S20] If a plurality of retrieval keywords and logical operators are contained in a document number subsequence acquisition request, the logical operation part 215 receives document number subsequences corresponding to each retrieval keyword from the subsequence acquisition part 214.

Then, the logical operation part 215 integrates the acquired document number subsequences based on the logical operators.

That is, if the logical operator is the logical addition (OR), the logical operation part 215 creates an array of document numbers contained in at least one of the document number subsequences of each of the plurality of retrieval keywords, which will be set as the document number subsequences in accordance with the document number subsequence acquisition request. If the logical operator is the logical product (AND), the logical operation part 215 creates an array of document numbers contained in both document number arrays of each of the plurality of retrieval keywords, which will be set as the document number subsequences in accordance with the document number subsequence acquisition request. Further, if a document number subsequence acquisition request contains only one retrieval keyword and no logical operator, the logical operation part 215 sets document number subsequences acquired by the subsequence acquisition part 214 in accordance with the retrieval keyword as the document number subsequences in accordance with the document number subsequence acquisition request.

[Step S21] The logical operation part 215 transmits the document number subsequences in accordance with the document number subsequence acquisition request to the document retrieval managing unit 100.

[Step S22] The document number array summarization part 123 of the document retrieval managing unit 100 summarizes document number subsequences transmitted from each of the document number subsequence acquisition apparatuses 210, 220, 230, and 240 to generate one summarized document number array. The document number array summarization part 123 delivers the generated document number array to the document list creation part 124.

[Step S23] The document list creation part 124 acquires document data matching part or all of document numbers contained in the document number array from the document DB 110. Then, the document list creation part 124 creates a document list based on the acquired document data and delivers the created document list to the retrieval result notification part 125.

[Step S24] The retrieval result notification part 125 transmits the document list received from the document list creation part 124 to the Web server 300 as a retrieval result of the document retrieval request.

[Step S25] The Web server 300 receives the retrieval result transmitted from the document retrieval managing unit 100.

[Step S26] The Web server 300 inserts the document list contained in the retrieval result into a retrieval result display document and transmits the document to the client 21 or 22 that issued the retrieval instructions.

A document number array in accordance with the retrieval keyword is acquired in this manner from the transposed index storage device 420 to generate a document retrieval result.

Figure 10:
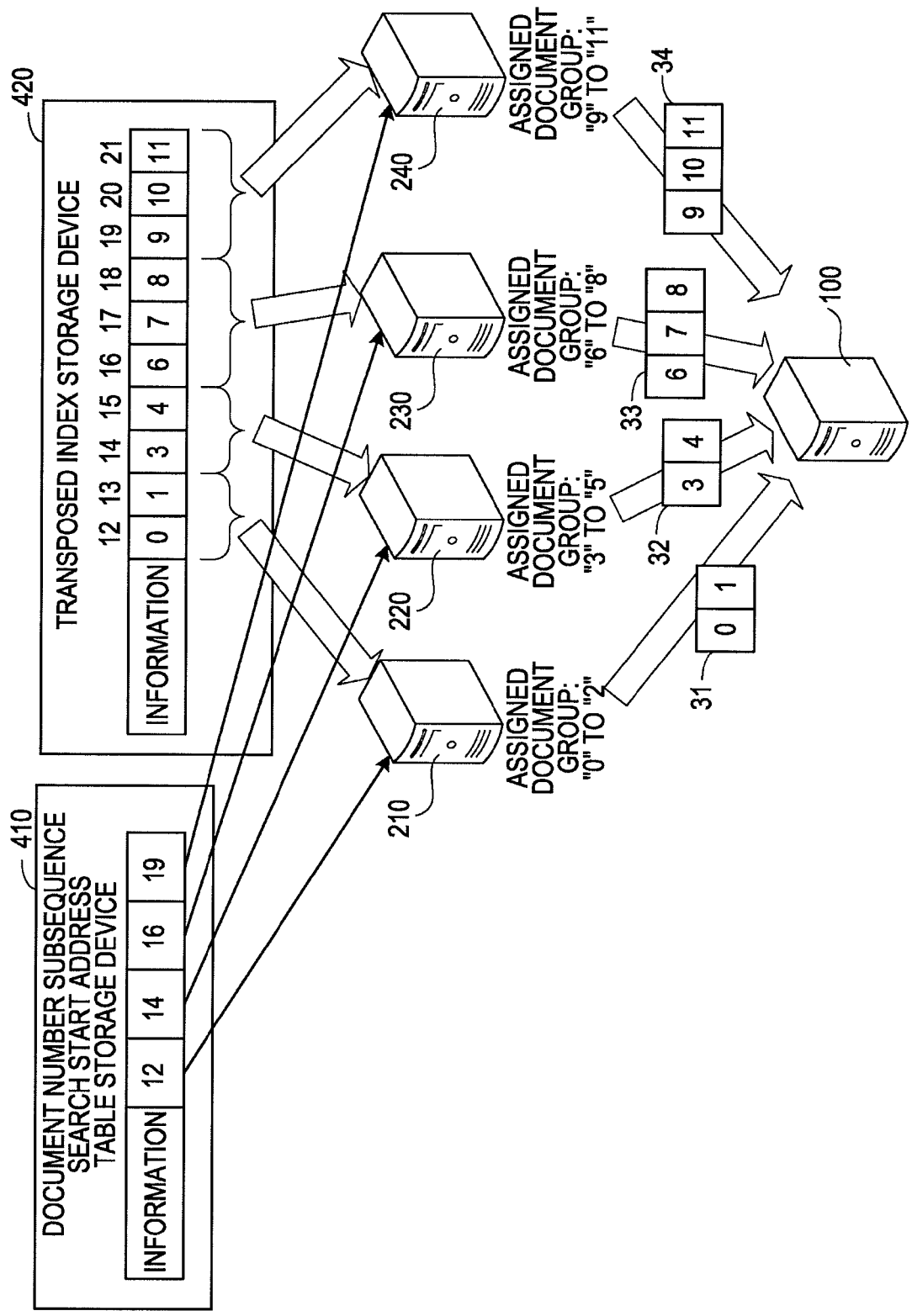
FIG. 10 is a diagram showing circumstances in which a document number array is acquired.

FIG. 10 is a diagram showing circumstances in which a document number array is acquired. This figure shows an example of acquiring a document number array corresponding to the retrieval keyword "information".

Referencing records of the retrieval keyword "information" in the document number subsequence search start address table storage device 410 shows that the subsequence search start address of the document number subsequence acquisition apparatus 210 is "12". Thus, the document number subsequence acquisition apparatus 210 extracts document numbers from the address "12" of the document number array mapped to the retrieval keyword "information" in the transposed index storage device 420. At this point, the assigned document group of the document number subsequence acquisition apparatus 210 ranges from the document number "0" to document number "2". Thus, the document number subsequence acquisition apparatus 210 acquires the document numbers "0" and "1" as document number subsequences 31. Since the next document number "3" is not contained in the assigned document group, the document number subsequence acquisition apparatus 210 discards the document number "13" and terminates extraction processing of document numbers. As a result, the document numbers "0" and "1" are transmitted as the document number subsequences 31 from the document number subsequence acquisition apparatus 210 to the document retrieval managing unit 100.

Similar processing is performed in the other document number subsequence acquisition apparatuses 220, 230, and 240. As a result, document numbers "3" and "4" are transmitted as the document number subsequences 32 from the document number subsequence acquisition apparatus 220 to the document retrieval managing unit 100. Document numbers "6", "7", and "8" are transmitted as document number subsequences 33 from the document number subsequence acquisition apparatus 230 to the document retrieval managing unit 100. Document numbers "9", "10", and "11" are transmitted as document number subsequences 34 from the document number subsequence acquisition apparatus 240 to the document retrieval managing unit 100.

As a result, all document number arrays registered with transposed indexes by mapping to retrieval keywords can be acquired by the document retrieval managing unit 100. In addition, each of the document number subsequence acquisition apparatuses 210, 220, 230, and 240 starts to search for document numbers contained in the assigned document group from the subsequence search start address to acquire only a portion of the document number array. Thus, document number subsequences can be obtained in a short time.

Since the transposed index storage device 420 is the RAID system in which striping is performed, HDDs actually accessed are distributed even if the plurality of document number subsequence acquisition apparatuses 210, 220, 230, and 240 accesses the transposed index storage device 420 simultaneously. Therefore, document number subsequences can be read out at high speed even if the plurality of document number subsequence acquisition apparatuses 210, 220, 230, and 240 access the transposed index storage device 420 simultaneously.

Next, transposed index creation processing will be described.

Figure 11:
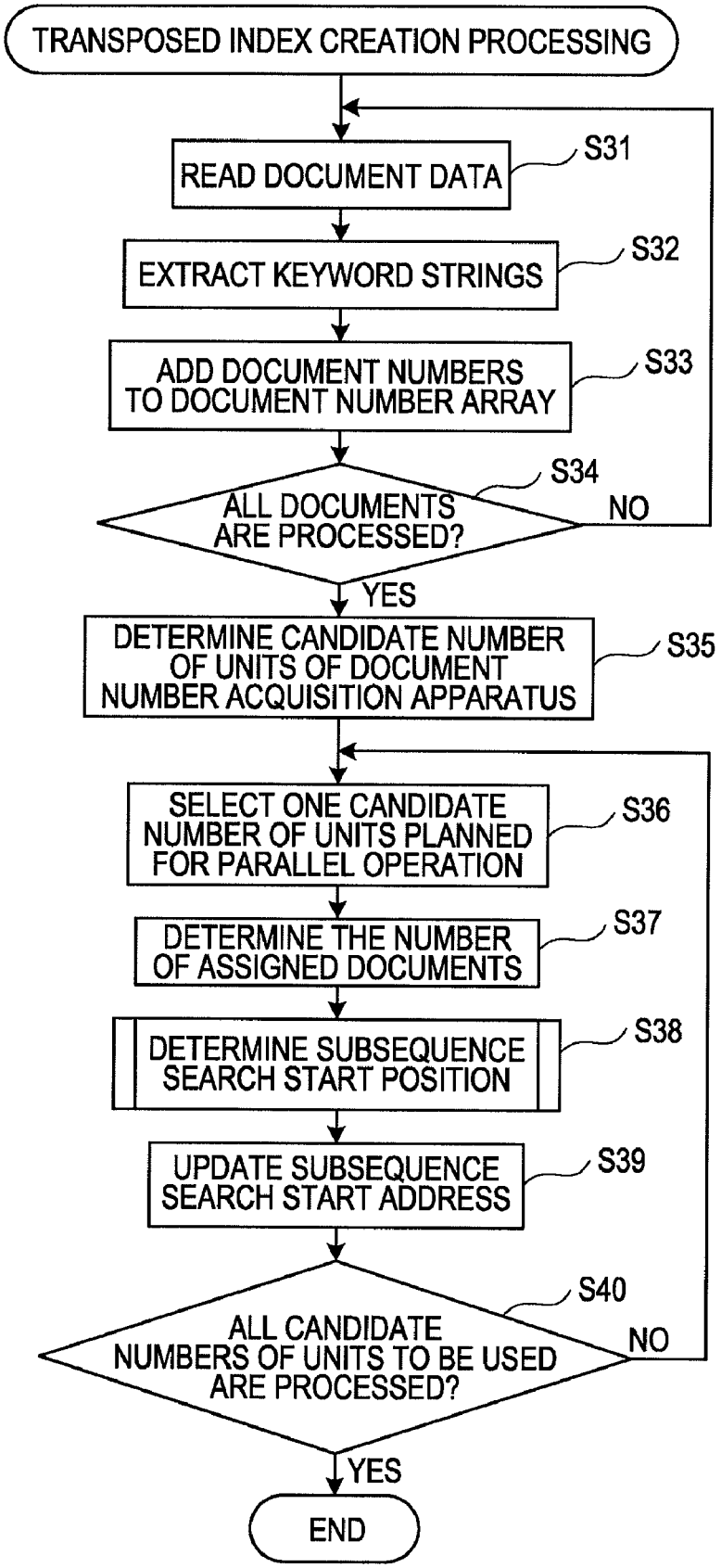
FIG. 11 is a flowchart showing the procedure for transposed index creation processing.

FIG. 11 is a flowchart showing the procedure for transposed index creation processing. Processing shown in FIG. 11 will be described below by following step numbers. The processing shown below is performed when an operations manager performs an operational input operation to instruct creation of a transposed index.

[Step S31] The transposed index creation part 126 reads one piece of document data whose information has not been reflected in a transposed index from the document DB 110. Document data whose information has not been reflected in a transposed index is placed, for example, in a specific folder in the document DB 110. Then, the transposed index creation part 126 reads one piece of document data from the specific folder in the document DB 110 and moves the read document data to a normal folder (a folder for storing document data whose information has been reflected in the transposed index) in the document DB 110.

[Step S32] The transposed index creation part 126 analyzes content of the read document data to extract keyword strings. More specifically, the transposed index creation part 126 performs morphological analysis on the document data to divide the data into a plurality of morphemes. Then, the transposed index creation part 126 selects a predetermined part (for example, the noun or gerund) among generated morphemes as keyword strings. The transposed index creation part 126 also generates a keyword string by concatenating a plurality of consecutive morphemes (predetermined part).

[Step S33] The transposed index creation part 126 accesses the transposed index storage device 420 to add document numbers to the document number array in the transposed index corresponding to the extracted keyword string.

[Step S34] The transposed index creation part 126 determines whether processing has been performed on all documents. If processing has been performed on all documents, processing proceeds to Step S35. If there is any document whose processing has not been completed, processing proceeds to Step S31.

[Step S35] The transposed index creation part 126 determines the candidate number of units of document number subsequence acquisition apparatus used for retrieval. The candidate number of units is specified in advance, for example, by the operations manager for the transposed index creation part 126. The transposed index creation part 126 stores a plurality of numbers indicating the candidate numbers of units specified by the operations manager in the RAM 102 or the like. In the present embodiment, it is assumed that two units, three units, and four units are specified as the candidate numbers of units of document number subsequence acquisition apparatus (candidate numbers of units planned for parallel operation).

[Step S36] The transposed index creation part 126 selects one unprocessed candidate number of units planned for parallel operation from candidate numbers of units planned for parallel operation of document number subsequence acquisition apparatus.

[Step S37] The transposed index creation part 126 determines the number of documents to be assigned to each unit of the document number subsequence acquisition apparatus. More specifically, the transposed index creation part 126 divides a number obtained by adding 1 to the document number of document data registered last (total number of pieces of document data) by the candidate number of units planned for parallel operation. A value obtained by division (a fractional portion is rounded up to the nearest integer) is determined as the number of assigned documents per unit of the document number subsequence acquisition apparatus.

A calculation formula can be expressed as follows:

Number of assigned documents per unit of the document number subsequence acquisition apparatus=ceil ((document number of the document registered last+1)/candidate number of units planned for parallel operation)

The document number and apparatus number start to count from 0. The function ceil( ) returns the minimum integer that is equal to or greater than the value specified as an argument.

[Step S38] The transposed index creation part 126 defines as many apparatus numbers as appropriate for the candidate number of units planned for parallel operation and determines a subsequence search start position for each apparatus number for each keyword string registered with a transposed index. The subsequence search start position is indicated by an address inside the transposed index. Details of the processing will be described later.

[Step S39] The transposed index creation part 126 accesses the document number subsequence search start address table in accordance with the selected candidate number of units planned for parallel operation in the document number subsequence search start address table storage device 410 to update the subsequence search start address for each apparatus number of each keyword string.

[Step S40] The transposed index creation part 126 determines whether processing has been performed for all candidate numbers of units planned for parallel operation determined in Step S35. If the processing has been performed for all candidate numbers of units planned for parallel operation, transposed index creation processing terminates. If there is any unprocessed candidate number of units planned for parallel operation, processing proceeds to Step S36.

With the above procedure, a transposed index and a document number subsequence search start address table for each candidate number of units planned for parallel operation are created.

Next, the procedure for subsequence search start position determination processing will be described in detail.

Figure 12:
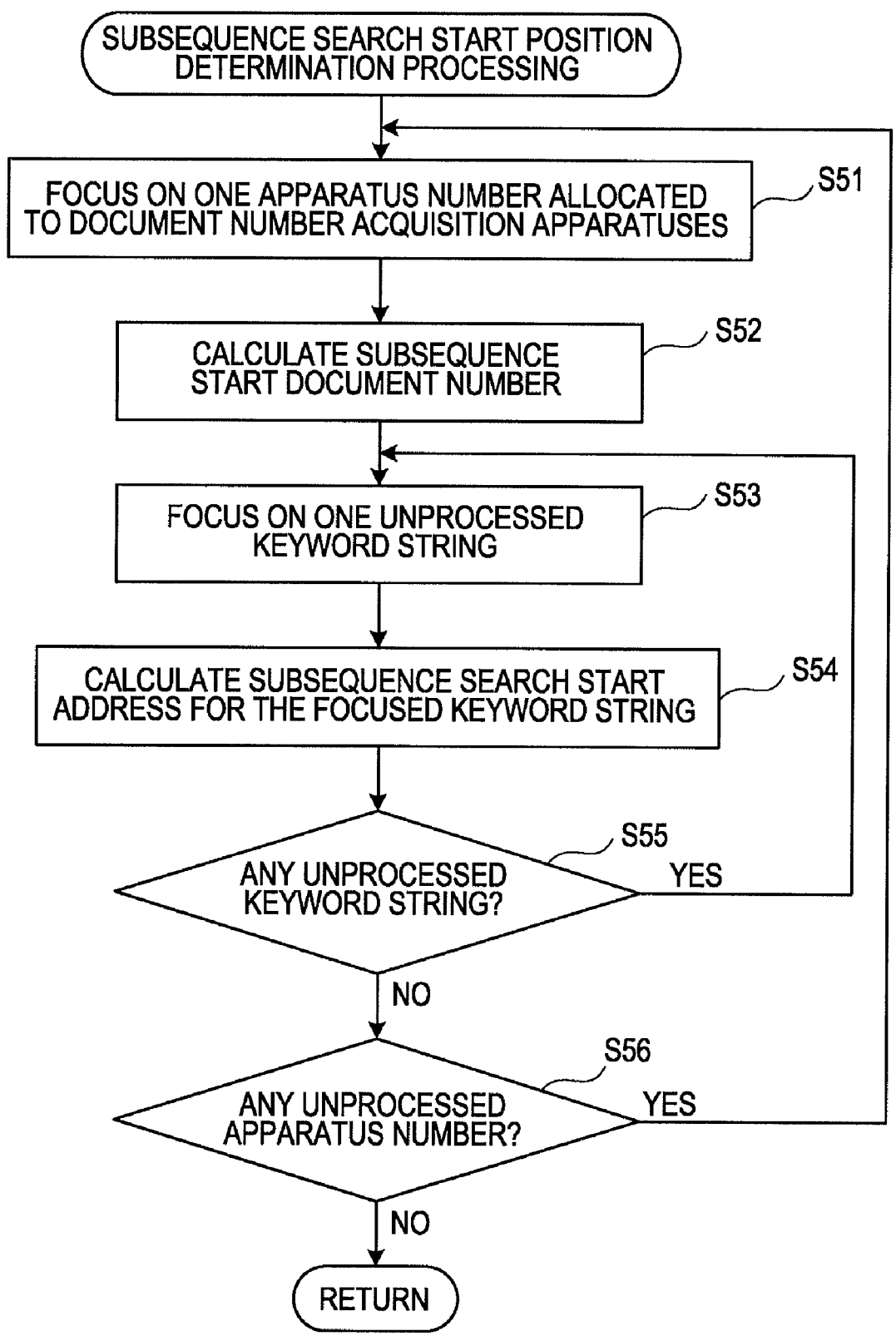
FIG. 12 is a flow chart showing the procedure for subsequence search start position determination processing.

FIG. 12 is a flow chart showing the procedure for subsequence search start position determination processing. Processing shown in FIG. 12 will be described below by following step numbers.

[Step S51] The transposed index creation part 126 focuses on one unprocessed apparatus number among as many apparatus numbers as appropriate for the selected candidate number of units planned for parallel operation.

[Step S52] The transposed index creation part 126 calculates a subsequence start document number. More specifically, the transposed index creation part 126 sets a value obtained by multiplying the number of assigned documents per unit of the document number subsequence acquisition apparatus by the focused apparatus number as the subsequence start document number. A mathematical expression is given as follows.

Subsequence start document number=number of assigned documents per unit of document number subsequence acquisition apparatus×apparatus number of the focused document number subsequence acquisition apparatus

[Step S53] The transposed index creation part 126 focuses on one keyword string whose subsequence search start address has not been calculated for the focused apparatus number among keyword strings registered with the transposed index 421 in the transposed index storage device 420.

[Step S54] The transposed index creation part 126 calculates a subsequence search start address for the focused keyword string. More specifically, the transposed index creation part 126 references the transposed index 421 in the transposed index storage device 420 to set the address of the minimum document number of document numbers equal to or greater than the subsequence start document number in the document number array corresponding to the focused keyword string as the subsequence search start address.

If no document number equal to or greater than the subsequence start document number is present in the document number array corresponding to the focused keyword string, the transposed index creation part 126 sets the address of the greatest document number in the document number array corresponding to the focused keyword string as the subsequence search start address.

[Step S55] The transposed index creation part 126 determines whether there is any unprocessed keyword string among keyword strings registered with the transposed index 421 in the transposed index storage device 420. If there is an unprocessed keyword string, processing proceeds to Step S53. If processing has been completed for all keyword strings, processing proceeds to Step S56.

[Step S56] The transposed index creation part 126 determines whether there is any unprocessed apparatus number among as many apparatus numbers as appropriate for the selected candidate number of units planned for parallel operation. If there is an unprocessed apparatus number, processing proceeds to Step S53. If there is no unprocessed apparatus number, processing terminates.

The transposed index creation part 126 first identifies an apparatus number before determining the document number search start address corresponding to the apparatus number for each keyword string in the flow chart shown in FIG. 12, but conversely a keyword string may first be identified before determining the document number search start address for each document number concerning the keyword string. If a keyword string is first identified, the document number search start address for each document number can then be determined without the transposed index 421 being accessed by reading all document number arrays corresponding to the relevant keyword string in the transposed index 421 into the RAM in advance. Thus, processing becomes more efficient.

With processing shown in FIGS. 11 and 12, the transposed index 421 shown in FIG. 7 and the document number subsequence search start address tables 411, 412, and 413 shown in FIG. 6 are created. In the present example, the document number subsequence search start address tables 411, 412, and 413 corresponding to two, three, and four units of document number subsequence acquisition apparatus respectively are created. As a result, if the number of units of document number subsequence acquisition apparatus is in the range of one to four, the document retrieval service can be continued even if the number of units varies. If there is only one unit, one document number subsequence acquisition apparatus may perform processing of all document number arrays without using any document number subsequence search start address table.

In the example shown in FIG. 2, for example, four units of the document number subsequence acquisition apparatuses 210, 220, 230, and 240 are operating. Therefore, the document number subsequence acquisition apparatuses 210, 220, 230, and 240 in operation acquire subsequences of document number arrays using the document number subsequence search start address table 413 for four units.

Assume that the number of retrieval requests per unit time decreases during operation of the document retrieval service to an amount that can be processed by three units of document number subsequence acquisition apparatus. In that case, one unit of the document number subsequence acquisition apparatus can be removed from the service and used for any other service. If the operation of the document number subsequence acquisition apparatus 240 is stopped, for example, the number of units of document number subsequence acquisition apparatus in operation is reduced to three. The document retrieval managing unit 100 checks operational conditions of each of the document number subsequence acquisition apparatuses 210, 220, 230, and 240. If the document retrieval managing unit 100 detects that the operation of the document number subsequence acquisition apparatus 240 has stopped, it changes the number of units in operation to three. Subsequently, when a document retrieval request is issued by the Web server 300 to the document retrieval managing unit 100, the document retrieval managing unit 100 transmits a document number subsequence acquisition request to each of the document number subsequence acquisition apparatuses 210, 220, and 230 by assuming that the number of units of document number subsequence acquisition apparatus in operation is three. After receiving the document number subsequence acquisition request, each of the document number subsequence acquisition apparatuses 210, 220, and 230 acquires the document number subsequence search start address table 412 for three units to acquire document number array subsequences. As a result, even though the operation of the document number subsequence acquisition apparatus 240 has stopped, document number arrays in a transposed index corresponding to a retrieval keyword can exhaustively be acquired.

According to the present embodiment, as described above, the number of units of document number subsequence acquisition apparatus can dynamically be changed even during operation. That is, if the number of units of document number subsequence acquisition apparatus is changed, the value of the number of units in parallel processing delivered from the document retrieval managing unit to the document number subsequence acquisition apparatus may be changed. Accordingly, the document number subsequence acquisition apparatus determines the subsequence search start address and assigned document group based on the document number subsequence search start address table in accordance with the number of units currently in operation to acquire appropriate document number subsequences.

As a result, the operations manager can easily add a document number subsequence acquisition apparatus if document number subsequence acquisition apparatuses are not sufficient for a quantity of documents to be retrieved. If there are sufficient processing capacities, the number of document number subsequence acquisition apparatuses may be reduced to allow an excessive apparatus to be used for any other service.

When a document number subsequence acquisition apparatus is added due to an increase in quantity of documents to be retrieved, the situation may not be so pressing. In that case, when determined that addition of a document number subsequence acquisition apparatus is necessary, the operations manager may create a document number subsequence search start address table in accordance with the number of units of document number subsequence acquisition apparatus after addition and store the document number subsequence search start address table in the document number subsequence search start address table storage device 410. Also in that case, a document number subsequence acquisition apparatus can be added in the same manner while continuing the system operation.

Since the transposed index 421 is stored in one storage system (RAID system logically handled as one system), time and effort to distribute document number arrays among a plurality of disks, which is conventionally needed, are not needed. As a result, a managerial load on the operations manager can be reduced. Moreover, if the number of HDDs in a RAID system in which striping is performed is increased as much as possible, HDDs actually to be accessed are distributed even if a plurality of document number subsequence acquisition apparatuses access the transposed index storage device 420 simultaneously. As a result, a delay in processing due to simultaneous access to the transposed index storage device 420 will be extremely short.

Second Embodiment

Next, a second embodiment will be described. The second embodiment is an example in which the document number subsequence search start address table to be generated is reduced by adopting discontinuous values for the candidate number of units planned for parallel operation of document number subsequence acquisition apparatus, instead of continuous integers. In the second embodiment, the first embodiment is adopted as a basic form and calculation processing of the subsequence search start address is changed as follows.

First, in creation processing of a transposed index, for example, the number of units of document number subsequence acquisition apparatus assumed for use is a multiple of 2 or a value of power of 2 only, instead of a continuous range of continuous integers. For retrieval processing, on the other hand, as many document number subsequence acquisition apparatuses as the assumed multiple of 2 or value of power of 2 are used and processing shall not be performed using other numbers of units.

Figure 13:
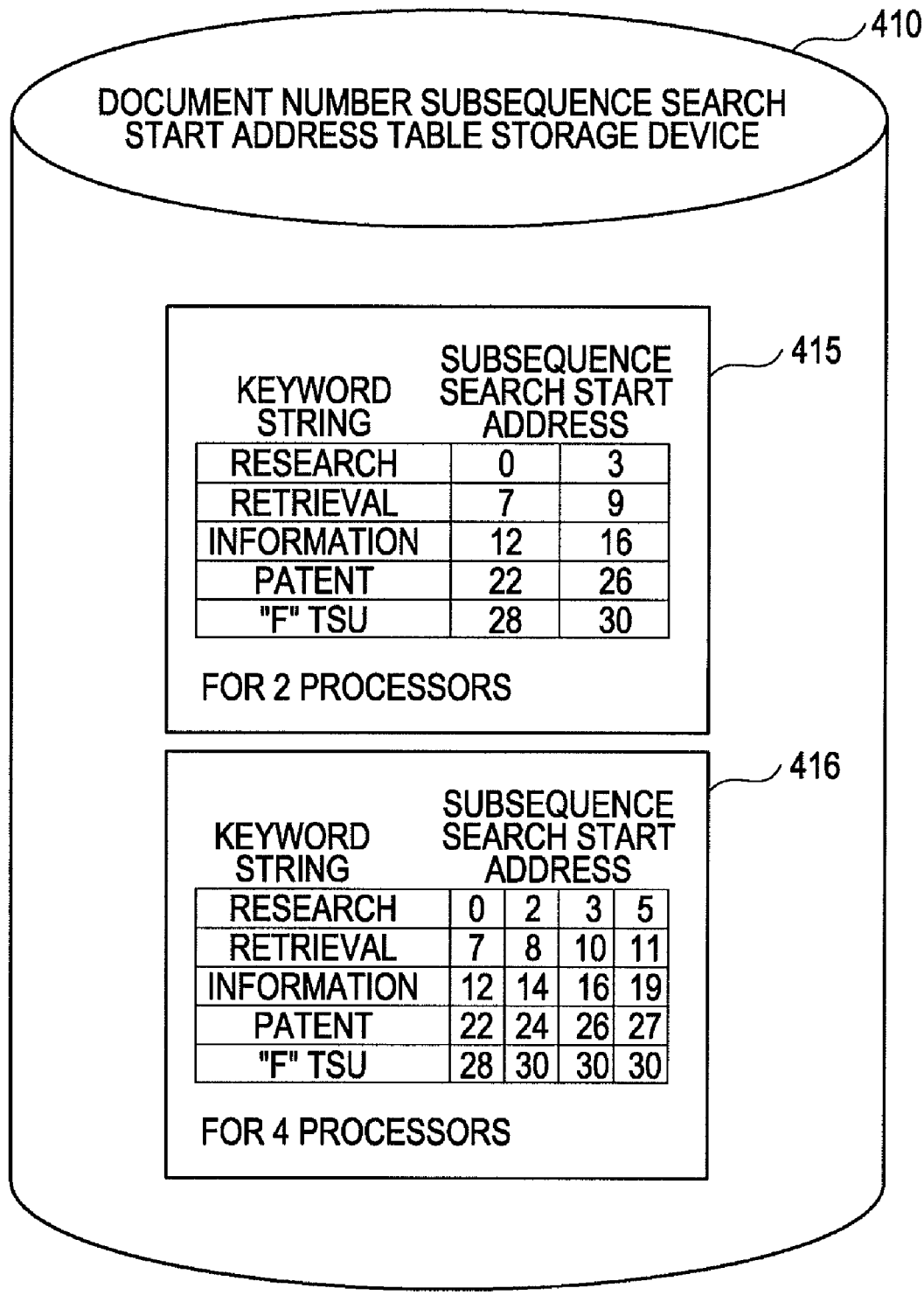
FIG. 13 is a diagram exemplifying a document number subsequence search start address table when the candidate number of units planned for parallel operation is a multiple of 2.

A document number subsequence search start address table when the number of units of document number subsequence acquisition apparatus assumed for use is 2 or 4, which are multiples of 2, is shown in FIG. 13.

FIG. 13 is a diagram exemplifying a document number subsequence search start address table when the candidate number of units planned for parallel operation is a multiple of 2. As shown in FIG. 13, a document number subsequence search start address table 415 for operation with two units of document number subsequence acquisition apparatus and a document number subsequence search start address table 416 for operation with four units of document number subsequence acquisition apparatus are stored in the document number subsequence search start address table storage device 410.

In this example, with the number of configuration patterns of document number subsequence acquisition apparatus assumed for use reduced, the processing time required for creating a document number subsequence search start address table and a recording area needed by a document number subsequence search start address table storage device can be reduced.

Third Embodiment

A third embodiment embodies integration of document number subsequence search start address tables for a plurality of candidate numbers of units for parallel operation into one. In the third embodiment, the first embodiment is adopted as a basic form and calculation processing of the subsequence search start address is changed as follows.

First, in creation processing of a transposed index, a common multiple of a plurality of numbers is set as the number of document number subsequence acquisition apparatuses to be used. For example, 12 is a common multiple of 2, 3, 4, and 6. For retrieval processing, on the other hand, two, three, four, and six units of document number subsequence acquisition apparatuses, which are values of divisors of the common multiple, are used and processing shall not be performed using other numbers of units.

An example of calculating a subsequence search start address when the number of document number subsequence acquisition apparatuses to be used is assumed to be 4, which is a multiple of 2 and 4, is shown in FIG. 14.

FIG. 14 is a diagram exemplifying the document number subsequence search start address table that can be used when the numbers of units for parallel operation are 2 and 4. As shown in FIG. 14, a document number subsequence search start address table 417 that can be used when the number of units of document number subsequence acquisition apparatus is two or four is stored in the document number subsequence search start address table storage device 410.

To create the document number subsequence search start address table 417, the transposed index creation part 126 first creates a document number subsequence search start address table when the number of units of document number subsequence acquisition apparatus is a common multiple (four units in the example of FIG. 14). Then, the transposed index creation part 126 adds a list of apparatus numbers for operation with the numbers of units corresponding to divisors of the common multiple (two units in the example of FIG. 14).

To add apparatus numbers, the transposed index creation part 126 determines a multiple by dividing a common multiple by the number of units planned for parallel operation. Then, the transposed index creation part 126 multiplies an apparatus number when operated with the number units corresponding to a divisor by the multiple and selects an apparatus number with the same number as a multiplication result from among apparatus numbers when operated with the number units corresponding to the common multiple. Then, the transposed index creation part 126 sets the apparatus number when operated with the number units corresponding to the divisor to the same field as that of the selected apparatus number.

Consider, for example, the case in which the apparatus number for two-unit operation shown in FIG. 14 is registered. First, since a common multiple is 4 and a divisor is 2, a multiple of "2" (4÷2) is obtained. Thus, if the apparatus number for two-unit operation of document number subsequence acquisition apparatus is 1, the transposed index creation part 126 registers the apparatus number thereof in the same field as that of the apparatus number 2 (1 (apparatus number)×2 (multiple)) for four-unit operation.

By creating a document number subsequence search start address table in accordance with a common multiple of a plurality of numbers, as described above, the same document number subsequence search start address table can be used when as many document number subsequence acquisition apparatuses as a divisor of the common multiple are operated. Accordingly, the processing time required for creating a document number subsequence search start address table and a recording area needed by a document number subsequence search start address table storage device are reduced.

Though a list of apparatus numbers in accordance with the numbers of units for operation is registered in the document number subsequence search start address table 417 in the above example, a list of apparatus numbers may not be contained in the document number subsequence search start address table 417. In that case, when the subsequence search start position determination part 212 references the document number subsequence search start address table 417, the apparatus number of the subsequence search start position determination part 212 is multiplied by a multiple (common multiple/number of units planned for parallel operation). Then, the subsequence search start position determination part 212 acquires a subsequence search start address in the sequence corresponding to the apparatus number, which is a multiplied value, from the document number subsequence search start address table 417.

Fourth Embodiment

A fourth embodiment enables one document number subsequence search start address table to deal with document number subsequence acquisition apparatuses regardless of the number of units in operation. That is, in the first embodiment, the number of document number subsequence search start address tables to be calculated is made equal to that of units of document number subsequence acquisition apparatus assumed for use. In the fourth embodiment, on the other hand, only one document number subsequence search start address table is created and the number of units of document number subsequence acquisition apparatus is not particularly assumed.

Thus, in the present embodiment, a document retrieval system sets addresses of document numbers (values equal to or smaller than start document numbers at predetermined intervals) close to document numbers at predetermined intervals (defined as start document numbers at predetermined intervals) in a document number subsequence search start address table, instead of setting precise (assigned document group start document numbers matching) subsequence search start addresses. Then, when determining the subsequence search start address, an address registered in the document number subsequence search start address table by mapping to a document number whose value is the greatest of document numbers equal to or smaller than the subsequence search start document number is defined as the search start address.

More specifically, processing described below is performed. Since system components are the same as those in the first embodiment, processing (differences from the first embodiment) in the fourth embodiment will be described using each component shown in FIG. 4.

Figure 15:
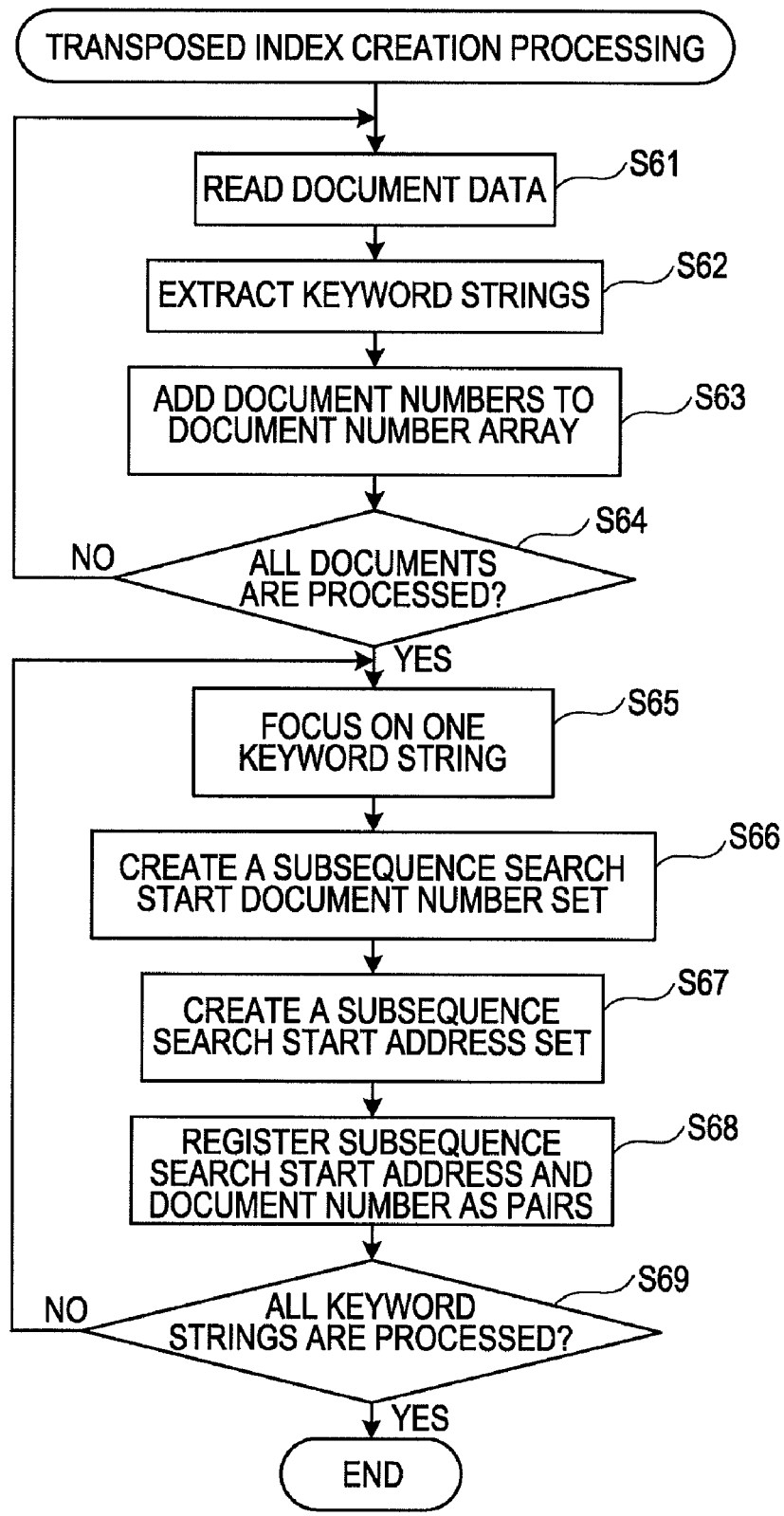
FIG. 15 is a flow chart showing the procedure for the transposed index creation processing in a fourth embodiment.

FIG. 15 is a flow chart showing the procedure for the transposed index creation processing in the fourth embodiment. Processing shown in FIG. 15 will be described below by following step numbers. Since Steps S61 to S64 are the same as Steps S31 to S34 of processing in the first embodiment shown in FIG. 11, a description will not be repeated here.

[Step S65] The transposed index creation part 126 focuses on one unprocessed keyword string registered with the transposed index 421.

[Step S66] The transposed index creation part 126 creates a set of subsequence search start document numbers (subsequence search start document number set). More specifically, the transposed index creation part 126 creates a set of document numbers, each of which is equal to or smaller than the value of each of multiples (integer equal to or greater than 0) of a numerical value indicating a preset document interval (for example, 1000) and the greatest document number in the document number array corresponding to the focused keyword string.

If, for example, the document interval is k (k is an integer equal to or greater than 1), the transposed index creation part 126 sets the start document number at predetermined intervals N=k×n (n is an integer equal to or greater than 0). Then, the transposed index creation part 126 performs processing shown below while counting up n from 0 in increments of 1:

The transposed index creation part 126 references the document number array corresponding to the focused keyword string in the transposed index 421 to acquire document numbers equal to or smaller than the start document number at predetermined intervals. Then, the transposed index creation part 126 adds the document number whose value is the greatest among acquired document numbers to the subsequence search start document number set. If, at this time, no document number equal to or smaller than the start document number at predetermined intervals is present, the transposed index creation part 126 determines that no document number corresponding to the start document number at predetermined intervals is present. Also, the transposed index creation part 126 determines whether the start document number at predetermined intervals N is larger than the maximum value of the document number each time n is counted up. When the start document number at predetermined intervals N becomes larger than the document number of the document registered last, the transposed index creation part 126 terminates creation of the subsequence search start document number set concerning the focused keyword string.

[Step S67] The transposed index creation part 126 determines the subsequence search start address for each document number contained in the subsequence search start document number set to create a subsequence search start address set. More specifically, the transposed index creation part 126 acquires an address in the transposed index storage device 420 of each document number contained in the subsequence search start document number set to define the address as the subsequence search start address. Then, the transposed index creation part 126 defines a set of subsequence search start addresses as the subsequence search start address set.

[Step S68] The transposed index creation part 126 registers pairs of subsequence search start addresses and document numbers that are brought into correspondence by associating with the focused keyword string in the document number subsequence search start address table in the document number subsequence search start address table storage device 410.

[Step S69] The transposed index creation part 126 determines whether processing has been performed for all keyword strings registered with the transposed index 421 in the transposed index storage device 420. If processing has been performed for all keyword strings, transposed index creation processing terminates. If there is any unprocessed keyword string, processing proceeds to Step S65.

Accordingly, a document number subsequence search start address table with paired subsequence search start addresses and document numbers is created for each keyword string.

Figure 16:
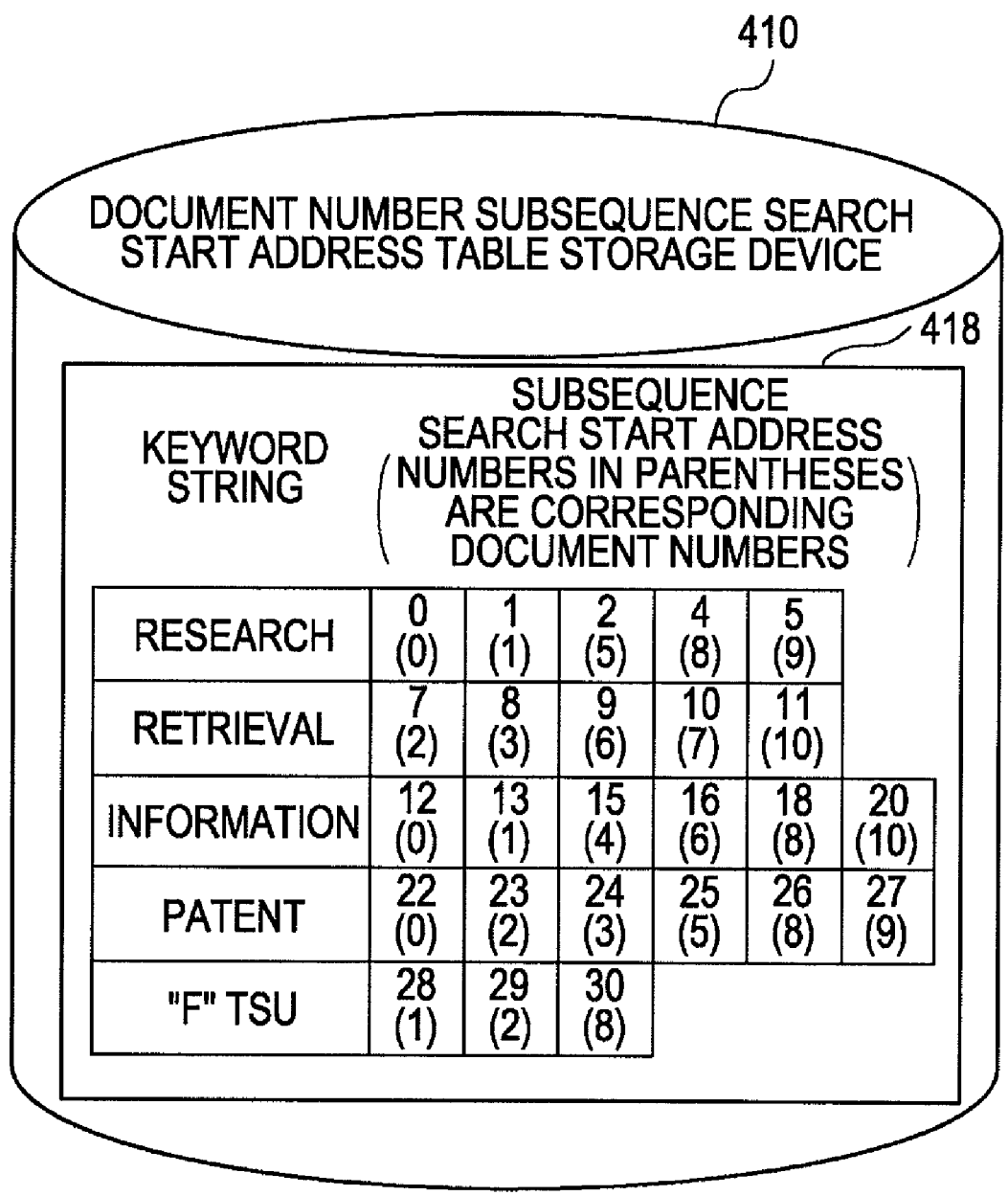
FIG. 16 is a diagram exemplifying the document number subsequence search start address table in the fourth embodiment.

FIG. 16 is a diagram exemplifying the document number subsequence search start address table in the fourth embodiment. In this example, the document interval is set to 2. In a document number subsequence search start address table 418, a plurality of subsequence search start addresses is registered for each keyword string. The document number (shown in parentheses in the figure) stored in the corresponding address is set to each subsequence search start address.

Like the first embodiment, the assigned document group determination part 211 determines the subsequence start document number and subsequence end document number for document retrieval. That is, after receiving a document number subsequence acquisition request, the assigned document group determination part 211 determines the number of assigned documents by dividing the number obtained by adding 1 to the document number of the document registered last by the number of units of document number subsequence acquisition apparatuses to be used. Then, the assigned document group determination part 211 calculates the subsequence start document number and subsequence end document number. That is, calculations shown below are performed:

Subsequence start document number=number of assigned documents per unit of document number subsequence acquisition apparatus×apparatus number of the focused document number subsequence acquisition apparatus; and Subsequence end document number=number of assigned documents per unit of document number subsequence acquisition apparatus×(apparatus number+1)−1.

Subsequently, the assigned document group determination part 211 delivers the retrieval keyword and subsequence start document number to the subsequence search start position determination part 212. The assigned document group determination part 211 also delivers the retrieval keyword, subsequence start document number, and subsequence end document number to the subsequence acquisition part 214.

The subsequence search start position determination part 212 accesses the document number subsequence search start address table 418 to reference document numbers attached to each of a plurality of subsequence search start addresses associated with keyword strings corresponding to the retrieval keyword. Then, the subsequence search start position determination part 212 extracts the greatest document number from document numbers equal to or smaller than the subsequence start document number of the subsequence search start position determination part 212 itself. Further, the subsequence search start position determination part 212 delivers the subsequence search start address corresponding to the extracted document number to the subsequence acquisition part 214. The subsequence acquisition part 214 accesses the transposed index 421 in the transposed index storage device 420 to sequentially extract document numbers ranging from the subsequence search start document number to the subsequence search end document number.

Accordingly, any number of document number subsequence acquisition apparatuses can be used. As a result, sufficient and necessary computer resources can be allocated to processing performance required by users or operations managers.

Fifth Embodiment

A fifth embodiment eliminates the need to update a document number subsequence search start address table even if a transposed index is updated until document data added to the document DB 110 exceeds a predetermined amount. That is, in transposed index creation processing shown in FIG. 11, processing in Step S35 and thereafter need not be performed each time processing in Steps S31 to S34 is performed. In other words, when a transposed index is updated, if the number of additionally registered documents is small, recalculation processing of the subsequence search start address is put off.

When a document is additionally registered with a transposed index, the document number of the document registered last is incremented. In that case, in retrieval processing, the subsequence start document number calculated for each document number subsequence acquisition apparatus is incremented or remains unchanged. If, at this time, a subsequence search start address remains an old value, at least non-existence of document numbers contained in document number subsequences before the address can be guaranteed. Thus, if the document number subsequence acquisition apparatus empty-reads (acquired document numbers are not included in an assigned document group and are discarded) document numbers smaller than the subsequence start document number, a correct result can be obtained even if the subsequence search start address remains the old value.

In the present embodiment, recreation of the document number subsequence search start address table can be put off up to a certain point even if document number arrays are moved in the storage device by adopting a relative address in a document number array corresponding to each keyword string as the subsequence search start address, instead of an absolute address in the transposed index storage device.

More specifically, processing described below is performed. Since system components are the same as those in the first embodiment, processing (differences from the first embodiment) in the fifth embodiment will be described using each component shown in FIG. 4.

Figure 17:
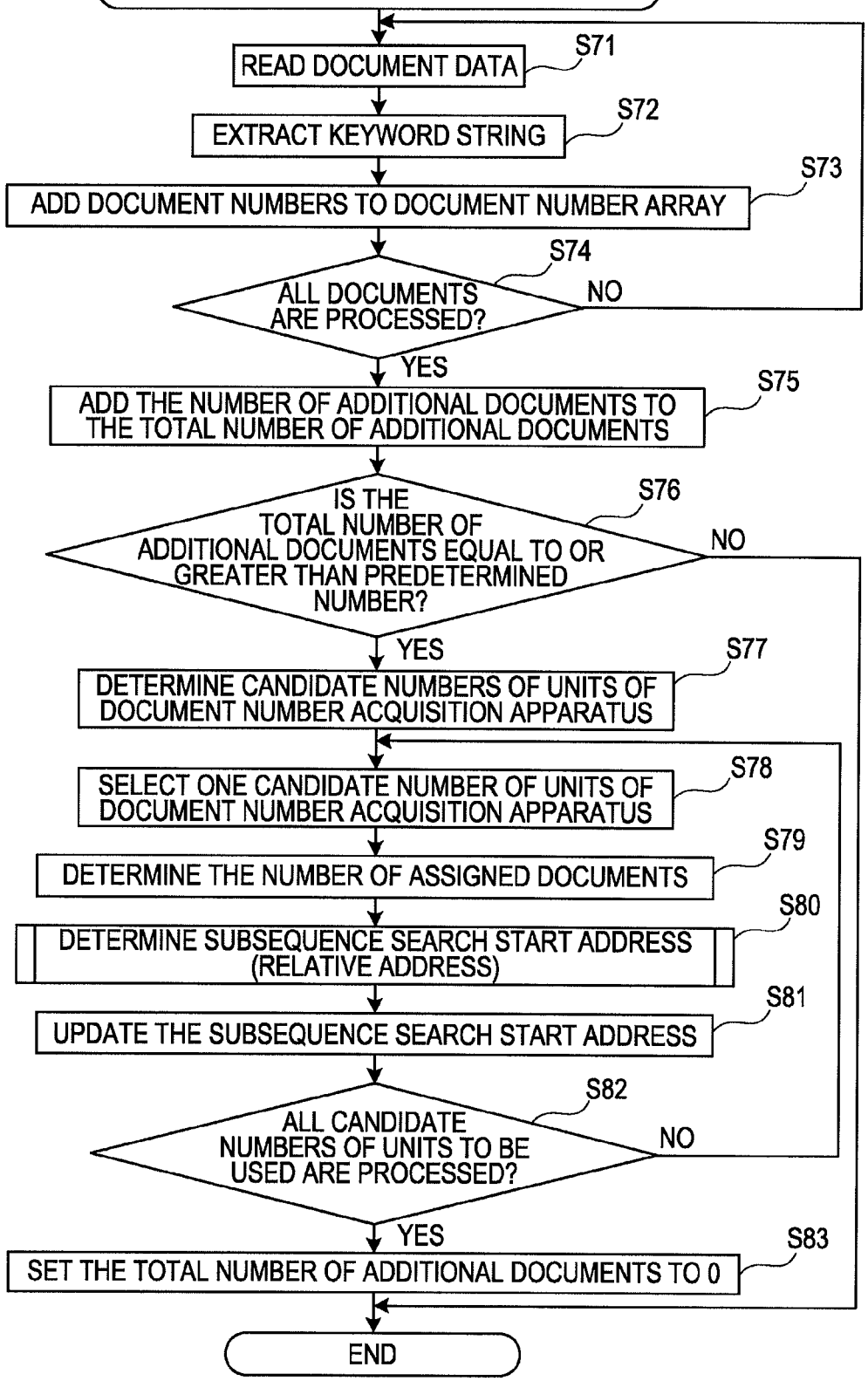
FIG. 17 is a flowchart showing the procedure for transposed index update processing in a fifth embodiment.

FIG. 17 is a flowchart showing the procedure for transposed index update processing in the fifth embodiment. Processing shown in FIG. 17 will be described below by following step numbers. Since Steps S71 to S74, S77 to S79, S81, and S82 are the same as Steps S31 to S38 and S40 of processing in the first embodiment shown in FIG. 11, a description will not be repeated here.

[Step S75] The transposed index creation part 126 adds the number (number of additional documents) of documents for which additional registration processing of document numbers has been performed by Steps S71 to S74 to the total number of additional documents. The total number of additional documents is a parameter held by the transposed index creation part 126 and is maintained in a storage area inside the RAM 102 after transposed index creation processing terminates. The total number of additional documents is recorded also in the HDD 103. By recording the total number of additional documents in the HDD 103, the total number of additional documents can be restored even if a system fails during operation.

[Step S76] The transposed index creation part 126 determines whether the total number (total number of additional documents) of documents for which additional registration processing of document numbers has been performed by processing of Steps S71 to S74 without updating the document number subsequence search start address table has reached or exceeded a predetermined number of documents (number of document number subsequence search start address table update threshold documents). The number of document number subsequence search start address table update threshold documents is set by the operations manager in advance in the transposed index creation part 126 and stored in a storage area such as the RAM 102. If the number of additional documents is equal to or greater than the number of document number subsequence search start address table update threshold documents, processing proceeds to Step S77. If the number of additional documents is smaller than the number of document number subsequence search start address table update threshold documents, processing terminates.

The same processing is performed in Steps S77 to S79 as that in Steps S35 to S37 in the first embodiment shown in FIG. 11. As a result, the number of assigned documents per unit of document number subsequence acquisition apparatus in accordance with the candidate number of units of document number subsequence acquisition apparatus is determined. Subsequently, processing proceeds to Step S80.

[Step S80] The transposed index creation part 126 determines a subsequence search start address. However, the subsequence search start address at this point is a relative address which is a relative value from the start address of the document number array associated with each keyword string. A concrete processing procedure is almost the same as subsequence search position determination processing in the first embodiment shown in FIG. 12. However, Step S54 is changed as shown below.

[Step S54] The transposed index creation part 126 calculates a subsequence search start address for the focused keyword string. More specifically, the transposed index creation part 126 references the transposed index 421 in the transposed index storage device 420 to acquire the address of the minimum document number of document numbers equal to or greater than the subsequence start document number in the document number array corresponding to the focused keyword string. Further, the transposed index creation part 126 subtracts the value of the address of the first document number in the document number array corresponding to the focused keyword string from the value of the acquired address. Then, the transposed index creation part 126 sets a subtraction result as the subsequence search start address.

If no document number equal to or greater than the subsequence start document number is present in the document number array corresponding to the focused keyword string, the transposed index creation part 126 subtracts the value of the address of the first document number in the document number array corresponding to the focused keyword string from the value of the address of the greatest document number in the document number array corresponding to the focused keyword string. Then, the transposed index creation part 126 sets a subtraction result as the subsequence search start address.

If the subsequence search start address is determined, the subsequence search start address is updated in the document number subsequence search start address table in the document number subsequence search start address table storage device 410 in Step S81.

If processing in Steps S78 to S82 is completed for all candidate numbers of units planned for parallel operation, processing proceeds to Step S83.

[Step S83] The transposed index creation part 126 sets the total number of additional documents to 0. Then, processing terminates.

Figure 18:
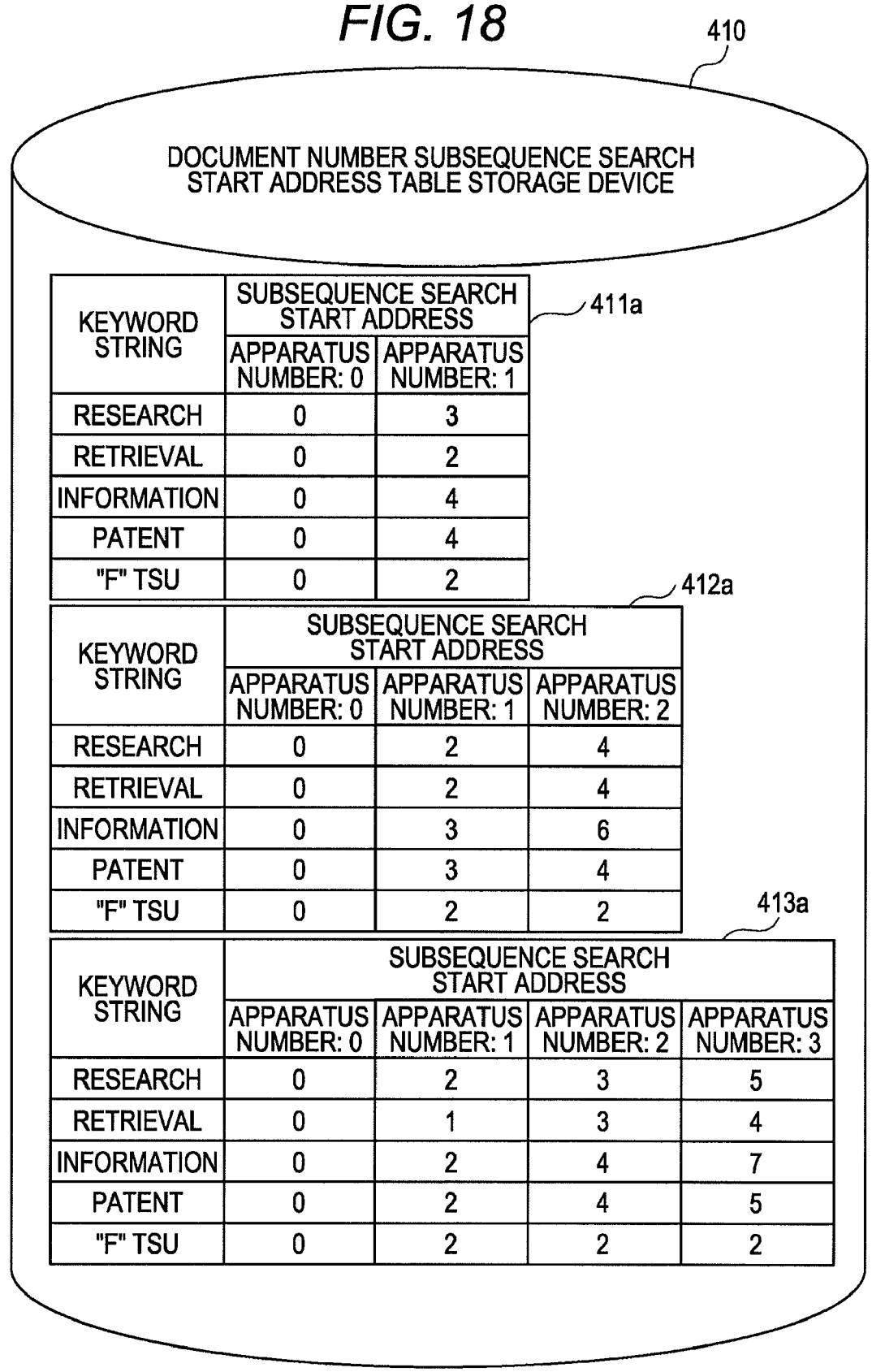
FIG. 18 is a diagram exemplifying the document number subsequence search start address table that specifies subsequence search start addresses using relative addresses.

FIG. 18 is a diagram exemplifying the document number subsequence search start address table that specifies subsequence search start addresses using relative addresses.

FIG. 18 shows a document number subsequence search start address table 411*a* to be used when the number of units of document number subsequence acquisition apparatus is 2, a document number subsequence search start address table 412*a* to be used when the number of units is 3, and a document number subsequence search start address table 413*a* to be used when the number of units is 4.

By omitting calculation processing of the subsequence search start address, as described above, the processing time required for update processing of a transposed index can be reduced. Moreover, by indicating the subsequence search start address as a relative value from the start of a document number array in which the relevant document number is set, the quantity of empty-reading (number of document numbers sequentially read from the subsequence search start address and determined to be smaller than the subsequence search start document number) can be reduced.

That is, if document numbers of a large number of documents are additionally registered with the transposed index, address values of document numbers that are positioned at rear addresses in the transposed index storage device 420 are significantly shifted from those when a document number subsequence search start address table was created. Thus, if the subsequence search start address is indicated by an absolute address like in the first embodiment, when acquiring a document number array of keyword strings registered in a rear position of the sequence of keyword strings, a large amount of empty-reading will occur before the subsequence search start document number is reached by extracting document numbers from the subsequence search start address.

Since the subsequence search start address is indicated in the fifth embodiment by a relative address, on the other hand, an address shift occurs only inside the document number array associated with a keyword string, preventing address shifts that occur for keyword strings registered in a forward position from being accumulated. As a result, the amount of empty-reading is reduced, leading to improved reading efficiency of document number subsequences.

Further, by using a relative address for the subsequence search start address, there is no need for updating the document number subsequence search start address table even if a document number array is relocated in a transposed index.

For example, even if the sequence of keyword strings is changed in a transposed index, there is no need to update the document number subsequence search start address table. If a new keyword string is added to a transposed index, it is necessary only to add a subsequence search start address corresponding to the keyword string to the document number subsequence search start address table.

Though the document number subsequence search start address table is updated when the total number of additional documents reaches or exceeds a predetermined value in the fifth embodiment, the document number subsequence search start address table may be updated when an elapsed time from the last update time of the document number subsequence search start address table is equal to or greater than a predetermined value.

Sixth Embodiment

A sixth embodiment performs the document number subsequence search start address table creation processing (Steps S77 to S82 in FIG. 17) in the fifth embodiment independently of update processing (Steps S71 to S74 in FIG. 17) of a transposed index. If, for example, the processing load of a document retrieval system is low, a subsequence search start address that has remained an old value is recalculated. A time when the processing load is low is, for example, when a load of CPU of the document retrieval managing unit 100 is detected to be a predetermined value or below. Also, if it is known in advance that the processing load is low (there are few document retrieval requests at midnight), document number subsequence search start address table creation processing may be performed in a preset midnight time zone.

By performing recalculation processing of the subsequence search start address independently, as described above, a more flexible system operation is enabled.

In each of the above embodiments, the transposed index creation part 126 is described as a function of the document retrieval managing unit 100, but is not necessarily located inside the document retrieval managing unit 100. Any computer that can access the document DB 110, document number subsequence search start address table storage device 410, and transposed index storage device 420 can be provided with the functions of the transposed index creation part 126 and caused to operate like the above embodiments. For example, the document number subsequence acquisition apparatus 210 may have the functions of the transposed index creation part 126 or a management server (not shown) may have the functions of the transposed index creation part 126.

Incidentally, addition or reduction of document number subsequence acquisition apparatus can be performed easily in a short time by using each of the above embodiments, but how many document number subsequence acquisition apparatuses should be used can be arbitrarily determined by the operations manager. When determining the number of units, operation conditions of a document retrieval system may be monitored before determining an appropriate number of units of document number subsequence acquisition apparatus based on a monitoring result.

When document retrieval processing is performed in the document retrieval managing unit 100, for example, information such as the number of retrieval requests processed simultaneously and processing times required for various retrieval requests is recorded as a retrieval execution log. The operations manager determines the number of units of document number subsequence acquisition apparatus with an optimal level of parallelism by analyzing content of the recorded retrieval execution log.

In addition, the above processing function can be realized by a computer. In that case, a program in which processing content of functions that the document retrieval managing unit 100 or document number subsequence acquisition apparatus 210 should have is described is provided. By executing the program on a computer, the above processing function is executed by the computer. A program that describes processing content can be recorded in a computer readable recording medium. Examples of the computer readable recording medium include a magnetic recorder, an optical disc, a magneto-optical recording medium, and a semiconductor memory. Examples of the magnetic recorder include a hard disc device (HDD), a flexible disc (FD), and a magnetic tape. Examples of the optical disc include a DVD (Digital Versatile Disc), a DVD-RAM (Random Access Memory), a CD-ROM (Compact Disc Read Only Memory), and a CD-R (Recordable)/RW (ReWritable). Examples of the magneto-optical recording medium include an MO (Magneto-Optical disk).

For distribution of a program, for example, portable recording media such as DVD and CD-ROM in which the program is recorded are sold. The program can also be transferred from a server computer to other computers via a network by storing the program in a storage device of the server computer.

A computer to execute a program stored in, for example, a portable recording medium or transferred from a server computer stores the program in a storage device of the computer. Then, the computer reads the program from the storage device thereof to perform processing according to the program. Incidentally, the computer can also perform processing according to the program by directly reading the program from a portable recording medium. The computer can also perform processing successively according to a received program each time the program is transferred from a server computer.

However, the present invention is not limited to the above embodiments and various modifications can be made without deviating from the spirit of the present invention.

The invention claimed is:

1. A document retrieval system performing retrieval of electronic documents, comprising:

a document database storing a plurality of pieces of document data, to each of which a document number is attached;

a transposed index storage device storing a transposed index in which the document numbers of the document data containing a keyword string are registered as an array in ascending order of numerical value of the document number by mapping to each of a plurality of the keyword strings;

a document number subsequence search start address table storage device storing a document number subsequence search start address table in which a value obtained by dividing a total number of documents, which is a number of pieces of document data registered with the document database, by a number of units planned for parallel operation is set as a number of assigned documents per unit, document groups obtained by compiling the document data in the document database into sets, each of which has as many documents as the number of assigned documents in ascending order of the document number, are sequentially defined as assigned document groups, the value of the document number corresponding to start document data in each of the defined assigned document groups is set as an assigned document group start document number of each, and a subsequence search start address indicating a position where the assigned document group start document number is recorded in an array of the document numbers mapped to each of the keyword strings in the transposed index is registered by mapping to the keyword string in ascending order of value of the corresponding assigned document group start document number;

a document retrieval managing unit having document number subsequence acquisition request means for transmitting the total number of documents, a number of units in parallel processing indicating a number of document number subsequence acquisition apparatuses in operation, and a document number subsequence acquisition request containing a retrieval keyword to each of a plurality of the document number subsequence acquisition apparatuses in response to a document retrieval request containing the retrieval keyword from a retrieval request apparatus, document number array summarization means for generating a document number array by acquiring document number subsequences returned from a plurality of the document number subsequence acquisition apparatuses in accordance with the document number subsequence acquisition request and summarizing the document numbers contained in the document number subsequences, document list creation means for creating a document list for the extracted document data after extracting the document data corresponding to each of the document numbers contained in the document number array generated by the document number array summarization means from the document database, and retrieval result notification means for transmitting the document list created by the document list creation means to the retrieval request apparatus; and a plurality of the document number subsequence acquisition apparatuses having assigned document group determination means for determining a document group in a sequence in accordance with a preset apparatus number of a local apparatus as the assigned document group when, upon receipt of the document number subsequence acquisition request from the document retrieval managing unit, the number of assigned documents per unit is calculated by dividing the total number of documents by the number of units in parallel processing and document groups obtained by compiling the document data in the document database into sets, each of which has as many documents as the number of assigned documents in ascending order of the document number, are sequentially defined, subsequence search start position determination means for extracting the subsequence search start address corresponding to the assigned document group start document number registered in the sequence in accordance with the apparatus number of the local apparatus from a plurality of the subsequence search start addresses associated with the keyword string corresponding to the retrieval keyword by referencing the document number subsequence search start address table in the document number subsequence search start address table storage device, and subsequence acquisition means for referencing the transposed index in the transposed index storage device, searching the array of the document numbers from the position indicated by the subsequence search start address extracted by the subsequence search start position determination means in ascending order, acquiring the document numbers contained in the assigned document group in the document number array associated with the keyword string corresponding to the retrieval keyword, and transmitting a set of the acquired document numbers to the document retrieval managing unit as the document number subsequence.

2. The document retrieval system according to claim 1, wherein
a plurality of the document number subsequence search start address tables, each of which are different in the numbers of units planned for parallel operation, of the document number subsequence acquisition apparatus is stored in the document number subsequence search start address table storage device, and
the subsequence search start position determination means references the document number subsequence search start address table for the number of units planned for parallel operation in accordance with the number of units for parallel processing indicated by the document number subsequence acquisition request to extract the subsequence search start address.

3. The document retrieval system according to claim 1, wherein
the document number subsequence search start address table for the number of units for parallel operation of the document number subsequence acquisition apparatus, which is a common multiple of a plurality of numerical values, is stored in the document number subsequence search start address table storage device and the subsequence search start address in the document number subsequence search start address table is mapped to the apparatus number when operated with as many document number subsequence acquisition apparatuses as each divisor of the common multiple, and
the subsequence search start position determination means detects the apparatus number thereof from among the apparatus numbers when as many document number subsequence acquisition apparatuses as the number of units for parallel processing are operated and extracts the subsequence search start address corresponding to the detected apparatus number.

4. The document retrieval system according to claim 1, wherein
a relative address expressing a position where the assigned document group start document number is recorded as a difference of address from a start position of the array of the document numbers in the array of the document numbers mapped to each of the keyword strings in the transposed index is registered as the subsequence search start address in the document number subsequence search start address table stored in the document number subsequence search start address table storage device, and
the subsequence acquisition means searches for the document number in a direction in which address values increase from a position obtained by adding the relative address indicated by the subsequence search start address to a start address in the array of the document numbers associated with the keyword string corresponding to the retrieval keyword in the transposed index storage device.

5. The document retrieval system according to claim 1, further comprising:
transposed index update means provided for the document retrieval managing unit for updating, after a transposed index creation instruction is input, the transposed index by referencing the document database and also the document number subsequence search start address table by referencing the updated transposed index.

6. The document retrieval system according to claim 1, further comprising:
transposed index update means provided for the document retrieval managing unit for updating, after a transposed index creation instruction is input, the transposed index by referencing the document database and, when a total number of pieces of the document data whose information has newly been reflected in the transposed index reaches or exceeds a predetermined number, the document number subsequence search start address table by referencing the updated transposed index.

7. A document retrieval system performing retrieval of electronic documents, comprising:
a document database storing a plurality of pieces of document data, to each of which document numbers are attached;
a transposed index storage device storing a transposed index in which the document numbers of the document data containing a keyword string are registered as an array in ascending order of numerical value of the document number by mapping to each of a plurality of the keyword strings;
a document number subsequence search start address table storage device storing a document number subsequence search start address table in which a value of the document number corresponding to a numerical value of a predetermined interval from a minimum value of the document number is set as a start document number at predetermined intervals, a subsequence search start address indicating a position where the start document number at predetermined intervals is recorded in an array of the document numbers mapped to each of the keyword strings in the transposed index is registered by mapping to the keyword string, and a greatest value of document numbers equal to or smaller than the start document number at predetermined intervals corresponding to the subsequence search start address in the array of the document numbers containing the position indicated by the subsequence search start address is attached to the subsequence search start address;
a document retrieval managing unit having document number subsequence acquisition request means for transmitting a total number of documents indicating the number of pieces of document data registered with the document database, a number of units in parallel processing indicating a number of document number subsequence acquisition apparatuses in operation, and a document number subsequence acquisition request containing a retrieval keyword to each of a plurality of the document number subsequence acquisition apparatuses in response to a document retrieval request containing the retrieval keyword from a retrieval request apparatus, document number array summarization means for generating a document number array by acquiring document number subsequences returned from a plurality of the document number subsequence acquisition apparatuses in accordance with the document number subsequence acquisition request and summarizing the document numbers contained in the document number subsequences, document list creation means for creating a document list for the extracted document data after extracting the document data corresponding to each of the document numbers contained in the document number array generated by the document number array summarization means from the document database, and retrieval result notification means for transmitting the document list created by the document list creation means to the retrieval request apparatus; and a plurality of the document number subsequence acquisition apparatuses having assigned document group determination means for determining a document group in a sequence in accordance with the preset apparatus number of a local apparatus as the assigned document group when, upon receipt of the document number subsequence acquisition request from the document retrieval managing unit, the number of assigned documents per unit is calculated by dividing the total number of documents by the number of units in parallel processing and document groups obtained by compiling the document data in the document database into sets, each of which having as many documents as the number of assigned documents in ascending order of document number, are sequentially defined, subsequence search start position determination means for extracting the subsequence search start address corresponding to the start document number at predetermined intervals to which the greatest value of the document number is attached among the start document numbers at predetermined intervals to which the document numbers equal to or smaller than the document number of start document data of the assigned document group from a plurality of the subsequence search start addresses associated with the keyword string corresponding to the retrieval keyword by referencing the document number subsequence search start address table in the document number subsequence search start address table storage device, and subsequence acquisition means for referencing the transposed index in the transposed index storage device, searching the array of the document numbers from the position indicated by the subsequence search start address extracted by the subsequence search start position determination means in ascending order, acquiring the document numbers contained in the assigned document group in the document number array associated with the keyword string corresponding to the retrieval keyword, and transmitting a set of the acquired document numbers to the document retrieval managing unit as the document number subsequence.

8. A document number subsequence acquisition apparatus, wherein a transposed index storage device storing a transposed index in which document numbers of document data containing a keyword string are registered as an array in ascending order of numerical value of the document number by mapping to each of a plurality of the keyword strings and a document number subsequence search start address table storage device storing a document number subsequence search start address table in which a value obtained by dividing a total number of documents, which indicates a number of pieces of document data registered with a document database, by a number of units planned for parallel operation is set as a number of assigned documents per unit, a value of the document number corresponding to start document data containing the keyword string in each document group when document groups obtained by compiling the document data in the document database into sets, each of which has as many documents as the number of assigned documents in ascending order of document number, are sequentially defined is set as an assigned document group start document number, and a subsequence search start address indicating a position where the assigned document group start document number is recorded in an array of the document numbers mapped to each of the keyword strings in the transposed index is registered by mapping to the keyword string in ascending order of a value of the corresponding assigned document group start document number are used, the document number subsequence acquisition apparatus for acquiring a portion of the array of the document numbers from the transposed index storage device in response to a document number subsequence acquisition request from a document retrieval managing unit, comprising:

assigned document group determination means for determining the document group in a sequence in accordance with a preset apparatus number of a local apparatus as an assigned document group, upon receipt of a total number of documents, which indicates the number of pieces of the document data, a number of units in parallel processing indicating a number of document number subsequence acquisition apparatuses in operation, and the document number subsequence acquisition request containing a retrieval keyword from the document retrieval managing unit, by calculating the number of assigned documents per unit by dividing the total number of documents by the number of units in parallel processing and sequentially defining document groups by compiling the document data in the document database into sets, each of which has as many documents as the number of assigned documents in ascending order of the document number;

subsequence search start position determination means for referencing the document number subsequence search start address table in the document number subsequence search start address table storage device and extracting the subsequence search start address corresponding to the assigned document group start document number registered in the sequence in accordance with the apparatus number of the local apparatus from a plurality of the subsequence search start addresses associated with the keyword string corresponding to the retrieval keyword; and subsequence acquisition means for referencing the transposed index in the transposed index storage device, searching the array of the document numbers from the position indicated by the subsequence search start address extracted by the subsequence search start position determination means in ascending order, acquiring the document numbers contained in the assigned document group in the document number array associated with the keyword string corresponding to the retrieval keyword, and transmitting a set of the acquired document numbers to the document retrieval managing unit.

9. A document retrieval method for performing retrieval of electronic documents, wherein:

a document database storing a plurality of pieces of document data to which document numbers are attached;

a transposed index storage device storing a transposed index in which the document numbers of the document data containing a keyword string are registered as an array in ascending order of numerical value of the document number by mapping to each of a plurality of the keyword strings; and a document number subsequence search start address table storage device storing a document number subsequence search start address table in which a value obtained by dividing a total number of documents, which indicates a number of pieces of document data registered with the document database, by a number of units planned for parallel operation is set as a number of assigned documents per unit, a value of the document number corresponding to start document data containing the keyword string in each document group when document groups obtained by compiling the document data in the document database into sets, each of which has as many documents as the number of assigned documents in ascending order of document number, are sequentially defined is set as an assigned document group start document number, and a subsequence search start address indicating a position where the assigned document group start document number is recorded in an array of the document numbers mapped to each of the keyword strings in the transposed index is registered by mapping to the keyword string in ascending order of a value of the corresponding assigned document group start document number are prepared in advance, document number subsequence acquisition request means of a document retrieval managing unit transmits the total number of documents indicating the number of pieces of document data registered with the document database, the number of units in parallel processing indicating the number of document number subsequence acquisition apparatuses in operation, and a document number subsequence acquisition request containing a retrieval keyword to each of a plurality of the document number subsequence acquisition apparatuses in response to a document retrieval request containing the retrieval keyword from a retrieval request apparatus, upon receipt of the document number subsequence acquisition request from the document retrieval managing unit, assigned document group determination means of each of the document number subsequence acquisition apparatuses calculates the number of assigned documents per unit by dividing the total number of documents by the number of units in parallel operation and, when document groups obtained by compiling the document data in the document database into sets, each of which has as many documents as the number of assigned documents in ascending order of document number, are sequentially defined, determines the document group in a sequence in accordance with the preset apparatus number of a local apparatus as an assigned document group, subsequence search start position determination means of each of the document number subsequence acquisition apparatuses references the document number subsequence search start address table in the document number subsequence search start address table storage device to extract the subsequence search start address corresponding to the assigned document group start document number registered in the sequence in accordance with the apparatus number of the local apparatus from a plurality of the subsequence search start addresses associated with the keyword string corresponding to the retrieval keyword, subsequence acquisition means of each of the document number subsequence acquisition apparatuses references the transposed index in the transposed index storage device, searches the array of the document numbers from the position indicated by the subsequence search start address extracted by the subsequence search start position determination means in ascending order, acquires the document numbers contained in the assigned document group in a document number array associated with the keyword string corresponding to the retrieval keyword, and transmits a set of the acquired document numbers to the document retrieval managing unit as a document number subsequence, document number array summarization means of the document retrieval managing unit acquires the document number subsequences returned from a plurality of the document number subsequence acquisition apparatuses in accordance with the document number subsequence acquisition request to generate the document number array by summarizing the document numbers contained in the document number subsequences, document list creation means of the document retrieval managing unit extracts the document data corresponding to each of the document numbers contained in the document number array generated by the document number array summarization means from the document database to create a document list of the extracted document data, and retrieval result notification means of the document retrieval managing unit transmits the document list created by the document list creation means to the retrieval request apparatus.

* * * * *